(12) United States Patent
Ta et al.

(10) Patent No.: US 12,439,182 B2
(45) Date of Patent: Oct. 7, 2025

(54) PHOTODETECTOR, ELECTRONIC DEVICE, AND METHOD OF PHOTODETECTION

(71) Applicant: KABUSHIKI KAISHA TOSHIBA, Tokyo (JP)

(72) Inventors: Tuan Thanh Ta, Kawasaki (JP); Akihide Sai, Yokohama (JP); Toshiki Sugimoto, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 542 days.

(21) Appl. No.: 17/653,537

(22) Filed: Mar. 4, 2022

(65) Prior Publication Data

US 2023/0073292 A1 Mar. 9, 2023

(30) Foreign Application Priority Data

Sep. 3, 2021 (JP) .................. 2021-144185

(51) Int. Cl.
*H04N 25/77* (2023.01)
(52) U.S. Cl.
CPC .................. *H04N 25/77* (2023.01)
(58) Field of Classification Search
CPC .... H04N 25/77; H04N 25/773; G01S 7/4863; G01S 17/10; G01S 17/89; H01L 31/02027
See application file for complete search history.

(56) References Cited

U.S. PATENT DOCUMENTS

| | | | |
|---|---|---|---|
| 5,168,154 A | 12/1992 | Harley | |
| 8,410,416 B2 | 4/2013 | Eldesouki et al. | |
| 10,666,885 B2 | 5/2020 | Matsuura et al. | |
| 2008/0290259 A1 | 11/2008 | Mathewson et al. | |
| 2020/0252564 A1 | 8/2020 | Palubiak | |
| 2020/0396410 A1 | 12/2020 | Ta et al. | |
| 2022/0003806 A1* | 1/2022 | Lilic | H03K 21/08 |
| 2022/0075033 A1* | 3/2022 | Shinozuka | G01S 17/08 |
| 2022/0136896 A1* | 5/2022 | Hirono | H01L 31/02027 |
| | | | 250/214 R |

(Continued)

FOREIGN PATENT DOCUMENTS

| | | | |
|---|---|---|---|
| CN | 109669114 A | 4/2019 | |
| CN | 112067120 A | 12/2020 | |

(Continued)

OTHER PUBLICATIONS

Office Action mailed Jun. 21, 2025, in Chinese Application No. 202210183326.7 filed Feb. 28, 2022 (w/partial English translation).

*Primary Examiner* — Georgia Y Epps
*Assistant Examiner* — Monica T Taba
(74) *Attorney, Agent, or Firm* — Oblon, McClelland, Maier & Neustadt, L.L.P.

(57) ABSTRACT

Provided is a photodetector including: a photodetection element; a reset circuit that sets one end of the photodetection element to an initialization voltage after the photodetection element detects light, and that includes a variable current source capable of varying a current to be supplied to the one end of the photodetection element; and a control circuit that stepwise or continuously increases a current to be supplied to the one end of the photodetection element by using the variable current source until the one end of the photodetection element is set to the initialization voltage after the photodetection element detects light.

17 Claims, 19 Drawing Sheets

(56) References Cited

U.S. PATENT DOCUMENTS

2022/0137194 A1* 5/2022 Tayu ................. H01L 31/02027
356/4.01

FOREIGN PATENT DOCUMENTS

| JP | 2019-169842 A | 10/2019 |
| JP | 2020-112495 A | 7/2020 |
| JP | 2020-202312 A | 12/2020 |
| WO | WO 2020/179696 A1 | 9/2020 |

* cited by examiner

| AFTERPULSE RATE (ASCENDING ORDER) | HOLD PERIOD | FIRST RESET CURRENT |
|---|---|---|
| x1 (LARGE) | T1 | I1 |
| x2 | T2 | I2 |
| x3 | T3 | I3 |
| ⋮ | ⋮ | ⋮ |
| xn (SMALL) | Tn | In |

# PHOTODETECTOR, ELECTRONIC DEVICE, AND METHOD OF PHOTODETECTION

CROSS REFERENCE TO RELATED APPLICATIONS

This application is based upon and claims the benefit of priority from the prior Japanese Patent Application No. 2021-144185, filed on Sep. 3, 2021, the entire contents of which are incorporated herein by reference.

FIELD

An embodiment of the present disclosure relates to a photodetector, an electronic device, and a method of photodetection.

BACKGROUND

Examples of a photodetection element that convert received light into an electrical signal include an avalanche photodiode (referred to below as APD). In particular, when an APD is operated in a Geiger mode, the APD has an ability to detect weak light of one photon. The APD operating in the Geiger mode has high sensitivity, but cannot detect light with high sensitivity due to change in operating state after detecting photons. This requires the APD to be connected to a quench circuit to reset the APD. The quench circuit includes a passive quenching circuit and an active quenching circuit. The passive quenching circuit includes a resistive element that is connected to the APD in series to cause a current to flow through the APD through the resistive element, thereby resetting the APD. The passive quenching circuit is simple in circuit configuration, but has a problem of slow operation. In contrast, the active quenching circuit forcibly causes a current to flow through the APD using a transistor or the like, and thus can perform reset operation of the APD at high speed.

Unfortunately, a conventional active quenching circuit may cause the APD to generate excessive heat resulting in destroying the APD because when the APD detects light while a current is allowed to flow through the APD to reset the APD, the current flowing through the APD cannot be controlled. When a large amount of current flows through the APD, the APD emits light, and thus a current due to crosstalk flows through another APD existing in the periphery.

DETAILED DESCRIPTION

According to an embodiment of the present disclosure, there is provided a photodetector including: a photodetection element; a reset circuit that sets one end of the photodetection element to an initialization voltage after the photodetection element detects light, and that includes a variable current source capable of varying a current to be supplied to the one end of the photodetection element; and a control circuit that stepwise or continuously increases a current to be supplied to the one end of the photodetection element by using the variable current source until the one end of the photodetection element is set to the initialization voltage after the photodetection element detects light.

Hereinafter, embodiments of a photodetector, an electronic device, and a method of photodetection will be described with reference to the drawings. Although main components of the photodetector and the electronic device will be mainly described below, the photodetector and the electronic device may have components and functions that are not illustrated or described. The following description does not exclude the components and the functions that are not illustrated or described.

First Embodiment

Figure 1:
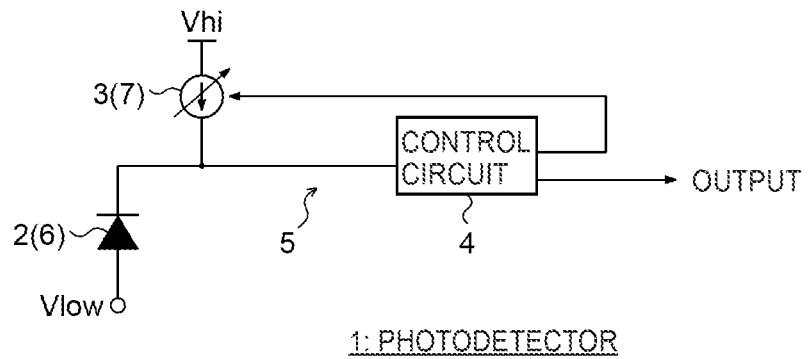
FIG. 1 is a circuit diagram of a photodetector according to a first embodiment.

FIG. 1 is a circuit diagram of a photodetector 1 according to a first embodiment. The photodetector 1 of FIG. 1 includes a photodetection element 2, a reset circuit 3, and a control circuit 4.

The reset circuit 3 and the control circuit 4 constitute an active quenching circuit 5. The active quenching circuit 5 performs forced reset operation on the photodetection element 2 after the photodetection element 2 detects light.

The photodetection element 2 is, for example, an APD 6. The APD 6 receives reverse bias voltage higher than breakdown voltage of the APD 6, and the APD 6 is driven in a region called a Geiger mode. The APD 6 during the Geiger mode has a very high gain of the order of $10^5$ to $10^6$, so that even weak light of one photon can be measured. Hereinafter, an example in which the APD 6 is used as a photodetection element 2 will be mainly described. Detection of light with the APD 6 may be referred to herein as "ignition".

The photodetector 1 of FIG. 1 includes the reset circuit 3 that is connected between a first voltage node Vhi and a cathode of the APD 6. The anode of the APD 6 is set to a predetermined voltage Vlow.

The reset circuit 3 sets the cathode of the APD 6 to the initialization voltage after the APD 6 detects light. The initialization voltage is equal to voltage at the first voltage node Vhi, for example. The reset circuit 3 includes a variable current source 7 capable of varying a current to be supplied to the cathode of the APD 6. The variable current source 7 adjusts a current to be supplied to the cathode of the APD 6 in response to a control signal from the control circuit 4.

The control circuit 4 changes a current to be supplied to the cathode of the APD 6 from the reset circuit 3 until the cathode of the APD 6 is set to the initialization voltage after the APD 6 detects light. More specifically, the control circuit 4 increases stepwise or continuously the current to be supplied to the cathode of the APD 6 by the reset circuit 3 until the cathode of the APD 6 is set to the initialization voltage after the APD 6 detects light. This increases a cathode voltage of the APD 6 stepwise or continuously.

Alternatively, the control circuit 4 changes on-resistance between the first voltage node Vhi and the cathode of the APD 6 until the cathode of the APD 6 is set to the initialization voltage after the APD 6 detects light. The reset circuit 3 supplies a larger amount of current to the cathode of the APD 6 as the on-resistance decreases. The control circuit 4 reduces the on-resistance of the reset circuit 3 stepwise or continuously until the cathode of the APD 6 is set to the initialization voltage after the APD 6 detects light.

The control circuit 4 also outputs a photodetection signal indicating whether the APD 6 has detected light. The photodetection signal output from the control circuit 4 is an analog signal, and is converted into a digital signal by an A/D converter (not illustrated in FIG. 1). This digital signal can be used for distance measurement, for example.

The photodetector 1 of FIG. 1 includes only one variable current source 7 that is connected to the cathode of the APD 6. Thus, the cathode of the APD 6 can be reduced in parasitic capacitance, and the cathode voltage of the APD 6 can be quickly returned to the initialization voltage. As described above, the photodetector 1 of FIG. 1 can shorten dead time until the APD 6 can detect subsequent light after detecting light.

Figure 2:
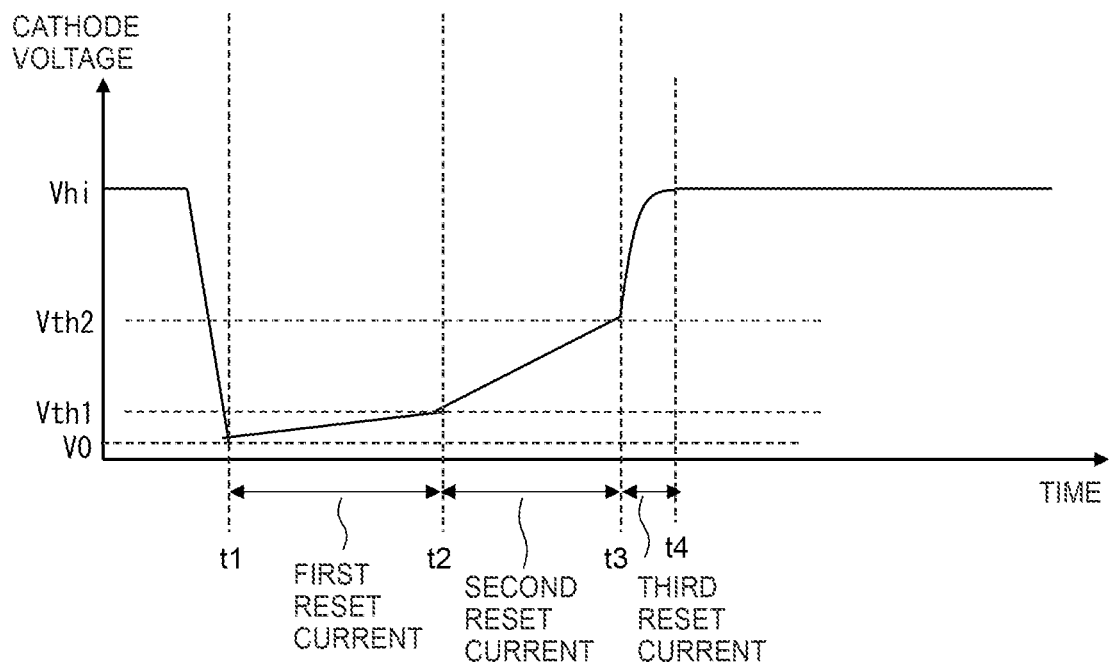
FIG. 2 is a voltage waveform diagram of a cathode of the APD of FIG. 1.
Figure 3:
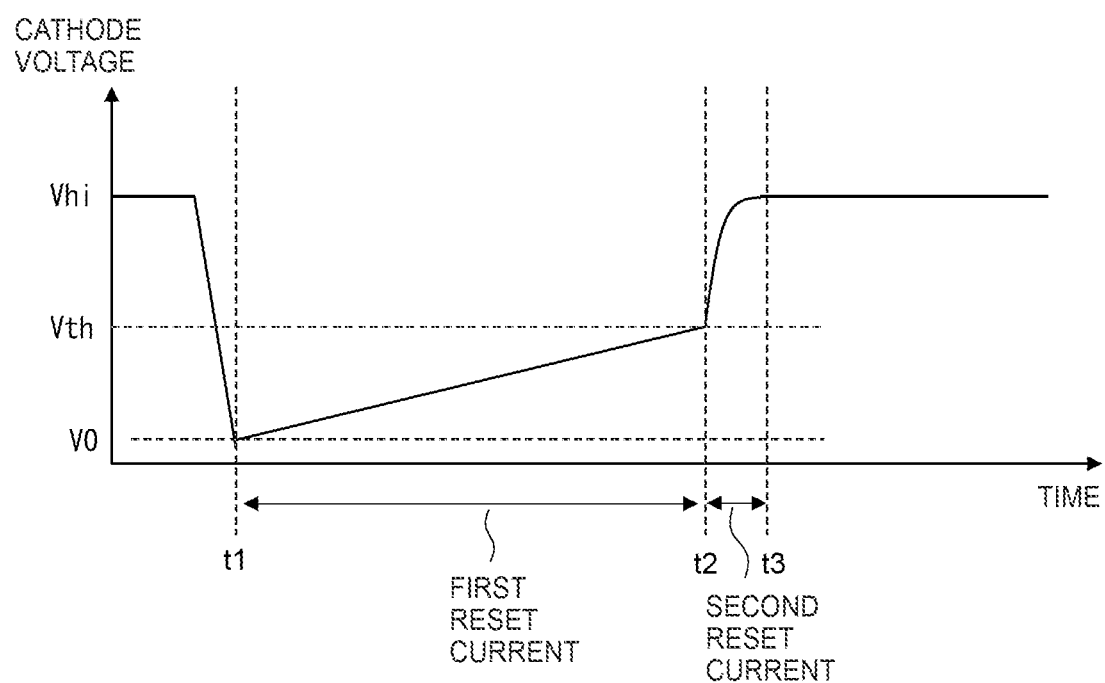
FIG. 3 is a voltage waveform diagram according to a modification of FIG. 1.

FIGS. 2 and 3 are each a voltage waveform diagram of the cathode of the APD 6 of FIG. 1. The example of FIG. 2 shows that when the APD 6 detects light at time t0, an avalanche current inside the APD 6 is generated, and then a cathode voltage of the APD 6 decreases to reach V0 at time t1. The reset circuit 3 supplies a first reset current to the cathode of the APD 6 during a period from time t1 to time t2, supplies a second reset current to the cathode of the APD 6 during a period from time t2 to time t3, and supplies a third reset current to the cathode of the APD 6 during a period from time t3 to time t4. The second reset current is larger than the first reset current, and the third reset current is larger than the second reset current. As described above, the photodetector 1 of FIG. 1 stepwise increases the reset current to be supplied to the cathode of the APD 6. Then, after time t4, a current value of the reset circuit 3 may be set to zero, or to a value of any one of the first reset current, the second reset current, and a fourth reset current different in value.

FIG. 2 shows the period from time t1 to time t2, the period from time t2 to time t3, and the period from time t3 to time t4, the periods each having an appropriate length. However, when the period from time t1 to time t2 is short, a large current is supplied to the cathode of the APD 6 while an electron-hole pair generated by light reception inside the APD 6 is not discharged from the APD 6, and thus the APD 6 may be re-ignited. Thus, the period from time t1 to time t2 is desirably set longer than the period from time t2 to time t3, and the period from time t2 to time t3 is desirably set longer than the period from time t3 to time t4.

When the cathode voltage of the APD 6 decreases to a voltage V0 (time t1), the control circuit 4 causes the variable current source 7 in the reset circuit 3 to supply the first reset current to the cathode of the APD 6. This causes the cathode voltage of the APD 6 to gradually increase as illustrated in FIG. 2.

When the cathode voltage of the APD 6 exceeds the first threshold voltage Vth1 (time t2), the control circuit 4 causes the variable current source 7 to supply the second reset current to the cathode of the APD 6. This increases the rising speed of the cathode voltage of the APD 6 during the period from time t2 to time t3 to more than the rising speed therein during the period from time t1 to time t2. Instead of increasing from V0 to Vth1, the cathode voltage in the period from time t1 to t2 may be set to a fixed value.

When the cathode voltage of the APD 6 exceeds second threshold voltage Vth2 (time t3), the control circuit 4 causes the variable current source 7 to supply the third reset current to the cathode of the APD 6. This causes the cathode voltage of the APD 6 to become the initialization voltage Vhi at time t4. This increases a degree of increase in the cathode voltage of the APD 6 during the period from time t3 to time t4 to more than a degree of increase therein during the period from time t2 to time t3.

Although the reset current is increased stepwise in three stages in FIG. 2, the reset current may be increased stepwise in two stages as illustrated in FIG. 3. The example of FIG. 3 shows that when the APD 6 detects light at time t0, an avalanche current inside the APD 6 is generated, and then a cathode voltage of the APD 6 decreases to reach V0 at time t1. The reset circuit 3 supplies the first reset current to the cathode of the APD 6 during a period from time t1 to time t2, and supplies the second reset current to the cathode of the APD 6 during a period from time t2 to time t3. Although FIG. 3 shows the period from time t1 to time t2 and the period from time t2 to time t3, the periods each having an appropriate length, the period from the time t1 to the time t2 may be set longer than the period from the time t2 to the time t3 from the viewpoint of preventing re-ignition of the APD 6.

In the case of FIG. 3, when the cathode voltage of the APD 6 decreases to the voltage V0 (time t1), the control circuit 4 causes the variable current source 7 to supply the first reset current to the cathode of the APD 6. When the cathode voltage of the APD 6 increases to a threshold voltage Vth (time t2), the control circuit 4 causes the variable current source 7 to supply the second reset current to the cathode of the APD 6. This causes the cathode voltage of the APD 6 to become the initialization voltage Vhi at time t4.

In the first embodiment described above, when the APD 6 detects light, the current supplied from the variable current source 7 in the reset circuit 3 to the cathode of the APD 6 is increased stepwise or continuously. This enables reducing the dead time until the APD 6 can detect subsequent light after detecting light while preventing re-ignition of the APD 6.

In the present embodiment, only one variable current source 7 is provided to be connected to the cathode of the APD 6, so that the cathode of the APD 6 can be reduced in parasitic capacitance. This enables the cathode voltage of the APD 6 to be quickly returned to the initialization voltage. Additionally, the photodetector 1 can be fabricated with a small circuit scale in the present embodiment, and thus facilitating integration in which many photodetectors 1 are disposed on a single semiconductor substrate.

Second Embodiment

A photodetector 1 according to a second embodiment provides a hold period for maintaining a cathode voltage of an APD 6 in a constant manner when the APD 6 detects light.

Figure 4:
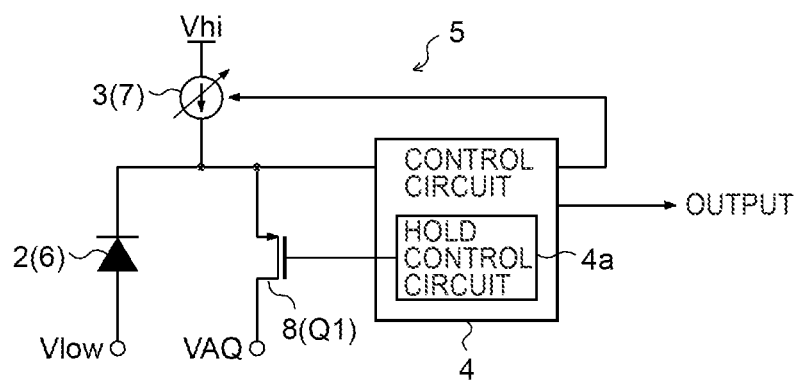
FIG. 4 is a circuit diagram of a photodetector according to a second embodiment.
Figure 5:
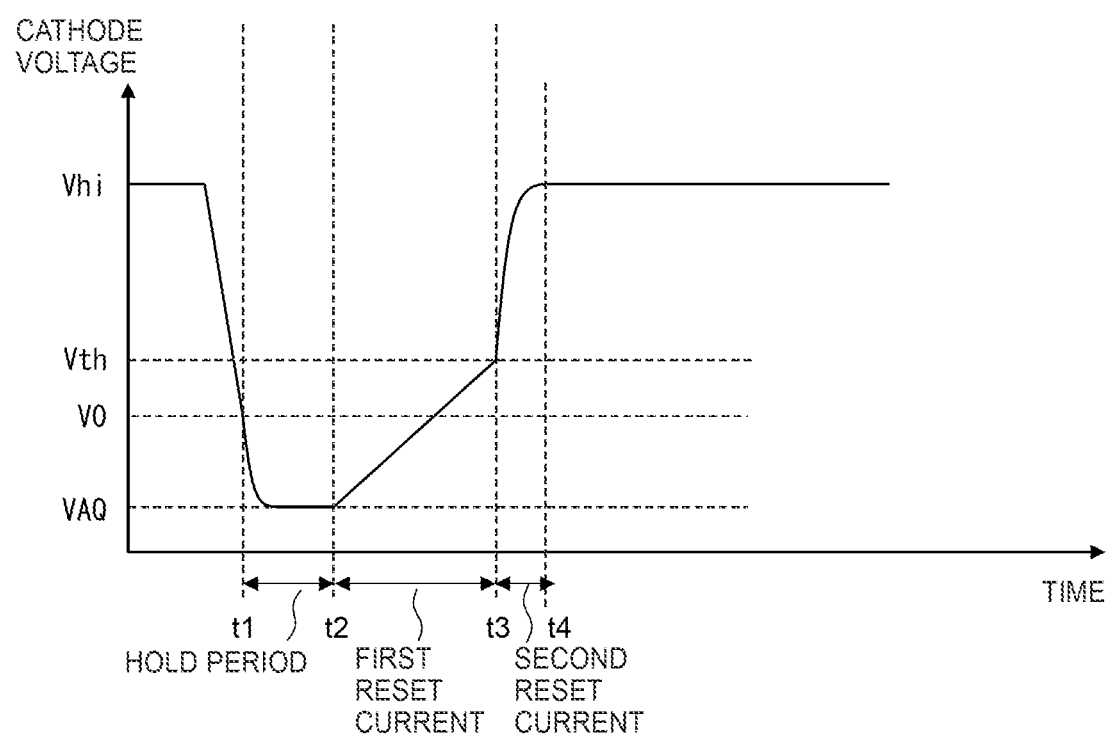
FIG. 5 is a voltage waveform diagram of the cathode of the APD of FIG. 4.

FIG. 4 is a circuit diagram of the photodetector 1 according to the second embodiment, and FIG. 5 is a voltage waveform diagram of a cathode of the APD 6 of FIG. 1. In FIG. 4, components common to those in FIG. 1 are denoted by the same reference numerals, and differences will be mainly described below.

Similarly to FIG. 1, the photodetector 1 of FIG. 4 includes a hold circuit 8 in addition to a photodetection element 2 including the APD 6, a reset circuit 3 including a variable current source 7, and a control circuit 4.

When the APD 6 detects light and the cathode voltage of the APD 6 decreases to or below a voltage Vth, the hold circuit 8 decreases the cathode voltage of the APD 6 to a voltage VAQ lower than a voltage V0, and then maintains the voltage VAQ for a predetermined period (from time t1 to time t2). The predetermined period is also referred to as a hold period.

The hold circuit 8 includes an NMOS transistor Q1, for example. The transistor Q1 includes a drain that is connected to the cathode of the APD 6, and a source that is set to the voltage VAQ. The transistor Q1 includes a gate that receives a hold control signal from the control circuit 4.

The hold control signal is generated by a hold control circuit 4a in the control circuit 4. As illustrated in FIG. 5, the hold control circuit 4a maintains the hold control signal at a high level during the hold period (times t1 to t2) from time t1 when the cathode voltage of the APD 6 decreases to a voltage Vth or less. This allows the cathode voltage of the APD 6 to be maintained at the voltage VAQ during a period where the hold control signal is at the high level.

At time t2, the control circuit 4 causes the variable current source 7 to supply a first reset current to the cathode of the APD 6 while controlling the hold signal to a low level to turn off the transistor Q1. The first reset current is larger than the first reset current in FIGS. 2 and 3. This enables the cathode voltage of the APD 6 to be increased in a shorter time in FIG. 5. Even when the first reset current is supplied from the variable current source 7 to the cathode of the APD 6 during the period between times t1 and t2, the first reset current is smaller than a current that can be drawn by the transistor Q1, and thus enabling the cathode voltage of the APD 6 to be maintained around the voltage VAQ. In this case, although a current unnecessarily flows with the voltage Vhi and with the voltage VAQ through the transistor Q1, control of the control circuit 4 can be simplified.

When the cathode voltage of the APD 6 increases to a threshold voltage Vth, the control circuit 4 causes the variable current source 7 to supply a second reset current to the cathode of the APD 6. This allows the cathode of the APD 6 to return to an initialization voltage (e.g., a voltage Vhi).

The reason for providing the hold circuit 8 is as follows. When the APD 6 detects light, an electron-hole pair is generated inside the APD 6. Then, an avalanche current is triggered by the electron-hold pair to generate many electron-hole pairs. This is an ignition phenomenon of the APD 6. When the many electron-hole pairs are generated, a potential difference across the APD 6 decreases to be equal to or less than breakdown voltage of the APD 6, and then the avalanche current stops. When the APD 6 is ignited, and then recharged to a voltage at which the APD 6 can be ignited before the electrons and holes inside the APD 6 are completely discharged, i.e., cathode voltage at which the potential difference across the APD 6 is equal to or higher than the breakdown voltage, an avalanche current may flow again inside the APD 6 despite no detection of light to cause the APD 6 to be re-ignited. This is called an after-pulse phenomenon. Shortening dead time until the APD 6 can detect subsequent light after detecting light may cause an avalanche current to flow before the electrons and holes in the APD 6 are completely discharged, so that the after-pulse phenomenon is likely to occur.

When the APD 6 detects light and the cathode voltage of the APD 6 falls to the voltage Vth or less, the photodetector 1 of FIG. 4 turns on the transistor Q1 in the hold circuit 8 to lower the cathode voltage of the APD 6 to the voltage VAQ. When the cathode voltage of the APD 6 is set to the voltage VAQ lower than the voltage V0, the electron-hole pairs inside the APD 6 can be quickly extracted through the transistor Q1. Thus, even when a current larger than the first reset current in FIGS. 2 and 3 is supplied to the cathode of the APD 6 from the variable current source 7 during the period from time t2 to time t3, no avalanche current flows through the APD 6. Allowing a large current to flow through the APD 6 means that time until the cathode voltage of the APD 6 is set to the initialization voltage can be shortened, and thus the dead time can be shortened.

Figure 6:
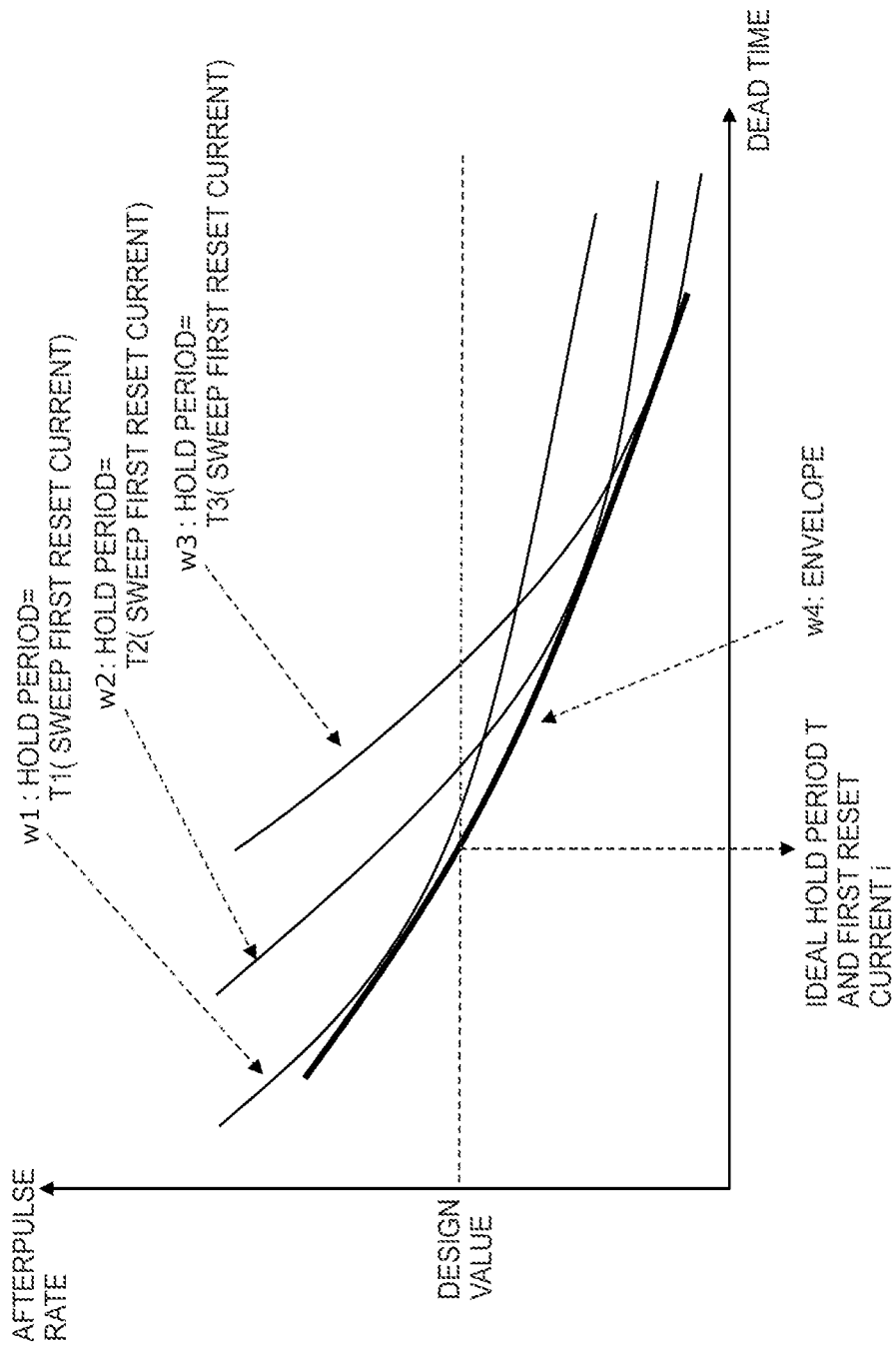
FIG. 6 is a graph illustrating characteristic curves of a plurality of hold periods.
Figures 7, 8:
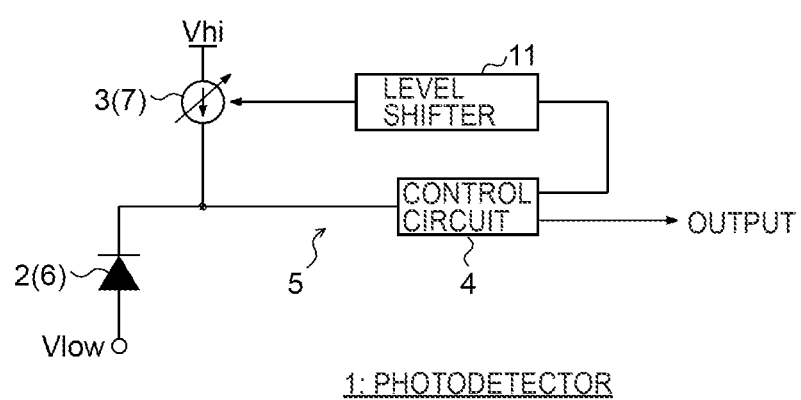
FIG. 7 is a table listing a correspondence relationship among an afterpulse rate, a hold period, and a first reset current, at each point on the envelope of FIG. 6.
FIG. 8 is a circuit diagram of a photodetector according to a third embodiment.

The hold period described above is set in advance before the photodetector 1 is operated. FIGS. 6 and 7 each illustrate an example of a method for setting the hold period. FIG. 6 illustrates characteristic curves of a plurality of hold periods. FIG. 6 has a horizontal axis that represents dead time DT, and a vertical axis that represents an afterpulse rate. FIG. 6 illustrates curves w1 to w3 that each indicate a correspondence relationship between the dead time and the afterpulse rate when the first reset current is swept for corresponding one of hold periods T1 to T3 set in advance. FIG. 6 illustrates a curve w4 that is an envelope connecting points at which afterpulse rates of a plurality of curves including the curves w1 to w3 are minimized. Although FIG. 6 illustrates three curves w1 to w3, the envelope is actually generated by connecting points at which the afterpulse rates of the plurality of curves different in hold period are minimized.

FIG. 7 is a table listing a correspondence relationship among the afterpulse rate, the hold period, and the first reset current, at each point on the envelope of FIG. 6. Each of data in FIG. 7 may be actually obtained by measurement or simulation, or may include data generated by interpolating a plurality of data obtained by measurement or simulation.

When the hold period is set, a curve having an afterpulse rate approximate to a design value of the afterpulse rate is selected. Specifically, when a design value X of the afterpulse rate is a value between afterpulse rates X2 and X3 in the list of FIG. 7, one of the pulse rates X2 and X3, closer to the design value X (e.g., X3), is selected, and the hold period T3 and a first reset current 13 corresponding to the selected afterpulse rate are selected. Alternatively, interpolation processing is performed using one of the afterpulse rates X2 and X3, closer to the design value X of the afterpulse rate, the corresponding one of the hold periods T2 and T3, and the corresponding one of the first reset currents 12 and 13, to obtain a hold period T and a first reset current corresponding to the design value X.

In the second embodiment described above, when the APD 6 detects light and the cathode voltage of the APD 6 decreases to the voltage V0, the voltage is maintained for a predetermined hold period while the hold circuit 8 lowers the cathode voltage of the APD 6 to the voltage VAQ lower than the voltage V0. This enables electrons and holes inside the APD 6 to be quickly and sufficiently extracted within the hold period. Thus, even when the variable current source 7 supplies a large current to the cathode of the APD 6 after the hold period ends, no avalanche current may flow through the APD 6, and thus the dead time can be shortened.

Third Embodiment

The variable current source 7 and the control circuit 4 of FIGS. 1 and 4 may be supplied with power source voltages different from each other. For example, the variable current source 7 increases voltage of the cathode of the APD 6 to the initialization voltage, and thus may be supplied with a power supply voltage higher than that to the control circuit 4. In this case, an input node of the variable current source 7 and on output node of the control circuit 4 in FIGS. 1 and 4 are different from each other in potential level, so that the input node of the variable current source 7 cannot be directly connected the output node of the control circuit 4.

For example, when the variable current source 7 has higher power supply voltage than the control circuit 4, the input node of the variable current source 7 in FIGS. 1 and 4 has a higher potential level than the output node of the control circuit 4. Thus, when a current of the variable current source 7 is controlled by a control signal output from the control circuit 4, the control signal is required for conversion of its potential level.

FIG. 8 is a circuit diagram of a photodetector 1 according to a third embodiment. The photodetector 1 of FIG. 8 is obtained by adding a level shifter 11 to the circuit configuration of FIG. 1.

The level shifter 11 converts a signal level of the control signal to be output from the control circuit 4, specifically, converts a potential level. The control signal with a potential level converted by the level shifter 11 is input to the variable current source 7 to control a current to be output from the variable current source 7.

The level shifter 11 may be added to the photodetector 1 of FIG. 4 to covert a potential level of a control signal output from the control circuit 4 in the photodetector 1 of FIG. 4 using the level shifter 11, and then the control signal may be input to the variable current source 7. As described later, at least a part of the level shifter 11 and the variable current source 7 can be integrated.

In the third embodiment described above, the level shifter 11 for converting a potential level of a control signal output from the control circuit 4 is provided to control a current of the variable current source 7 using the control signal with the potential level after the conversion. Thus, even when the variable current source 7 and the control circuit 4 are supplied with power supply voltages different from each other, the variable current source 7 can be controlled by the control circuit 4.

Fourth Embodiment

Various configurations are conceivable for the internal configuration of the variable current source 7 according to the first to third embodiments. Hereinafter, a representative configuration of the variable current source 7 will be described.

(First Example of Variable Current Source 7)

Figure 9:
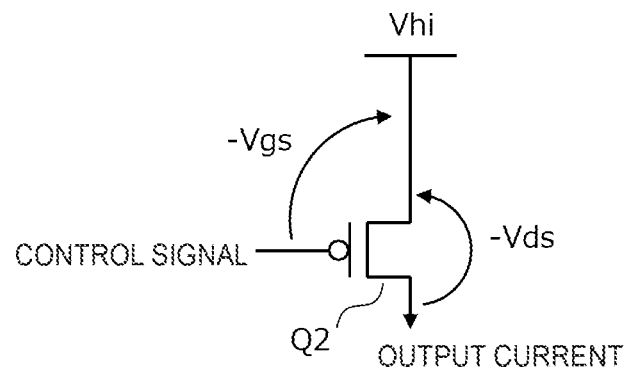
FIG. 9 is a circuit diagram of a first example of a variable current source.

FIG. 9 is a circuit diagram of a first example of the variable current source 7. The variable current source 7 of FIG. 9 includes a PMOS transistor Q2. The transistor Q2 of FIG. 9 includes a gate that receives a control signal from the control circuit 4. As illustrated in FIG. 8, the control signal may be a control signal with a potential level after conversion using the level shifter 11. The transistor Q2 of FIG. 9 includes a source that is connected to the first voltage node Vhi, and a drain from which a current is output and supplied to the cathode of the APD 6.

Figure 10:
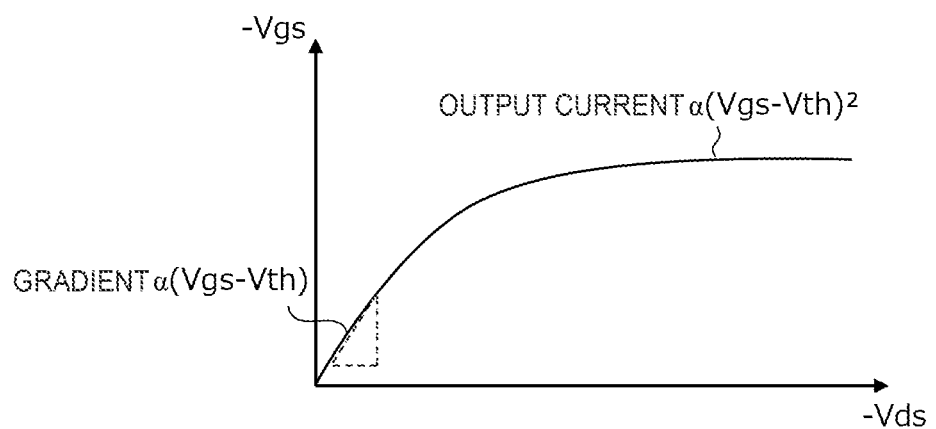
FIG. 10 is a characteristic diagram of the variable current source of FIG. 9.

FIG. 10 is a characteristic diagram of the variable current source 7 of FIG. 9. FIG. 10 has a horizontal axis that represents drain-source voltage (-Vds) of the transistor Q2 of FIG. 9, and a vertical axis that represents gate-source voltage (-Vgs).

A current of the variable current source 7 is represented by $\alpha\,(Vgs-Vth)^2$, where Vth is a threshold voltage of the transistor Q2, and $\alpha$ is a coefficient for obtaining a drain-source current of the transistor Q2 from a gate-source voltage Vgs of the transistor Q2. In the above, a and Vth are constants determined by a semiconductor process and a size of the transistor Q2.

As can be seen from the expression, $\alpha\,(Vgs-Vth)^2$, the current of the variable current source 7 in FIG. 10 changes little by little while a control signal, i.e., Vgs, is small, and the amount of change increases as the control signal increases in potential level.

Figure 11:
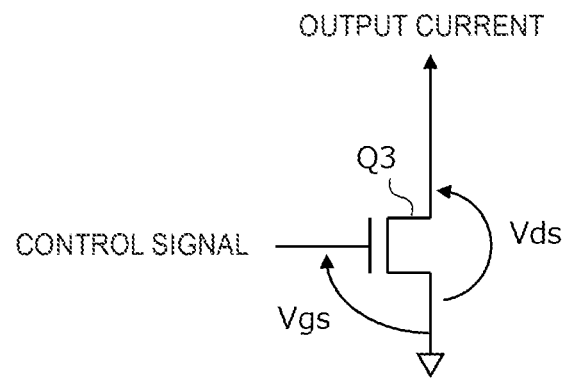
FIG. 11 is a circuit diagram of a variable current source according to a modification of FIG. 9.
Figure 12:
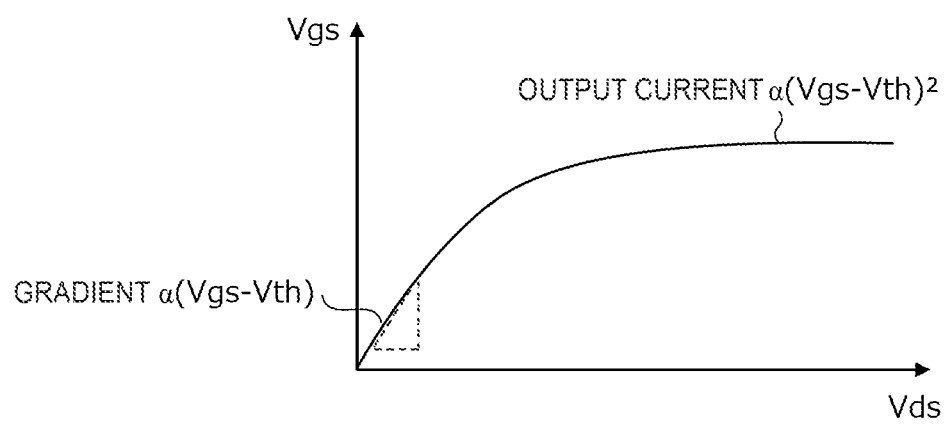
FIG. 12 is a characteristic diagram of the variable current source of FIG. 11.

Although FIG. 9 illustrates an example in which the variable current source 7 includes the PMOS transistor Q2, the variable current source 7 may include an NMOS transistor Q3 as in FIG. 11. FIG. 11 is a circuit diagram of the variable current source 7 according to a modification of FIG. 9, and FIG. 12 is a characteristic diagram of the variable current source 7 of FIG. 11. FIG. 12 has a horizontal axis that represents drain-source voltage Vds of the transistor Q3 of FIG. 11, and a vertical axis that represents gate-source voltage Vgs.

Similar to the variable current source 7 of FIG. 9, a current of the variable current source 7 of FIG. 11 is represented by $\alpha\,(Vgs-Vth)^2$.

(Second Example of Variable Current Source 7)

Figure 13:
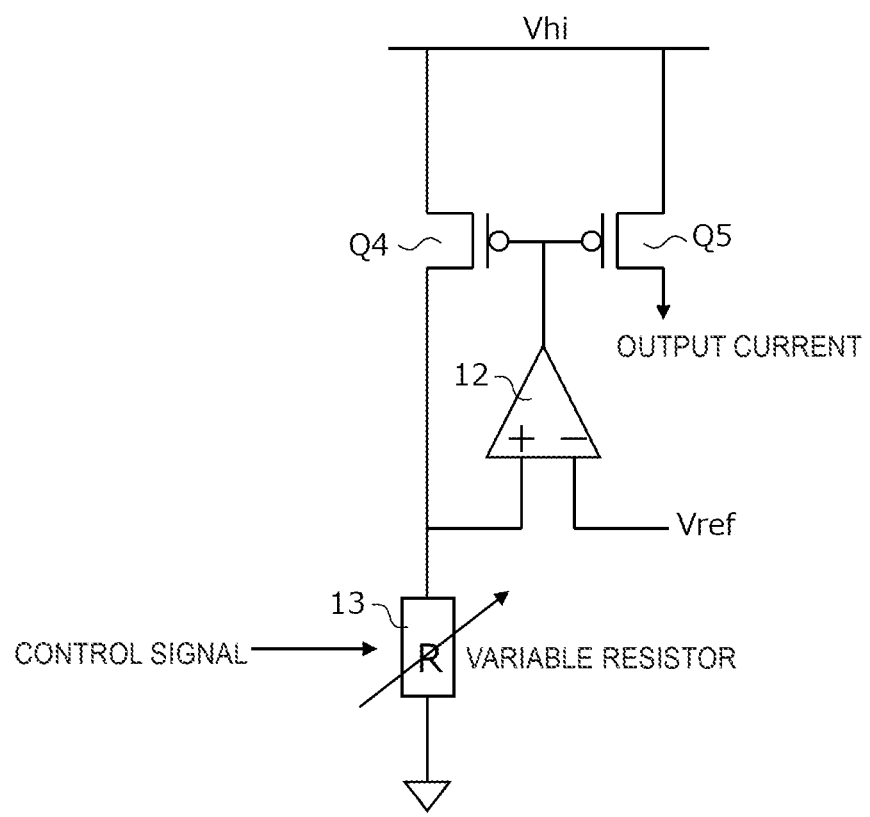
FIG. 13 is a circuit diagram of a second example of the variable current source.

FIG. 13 is a circuit diagram of a second example of the variable current source 7. The variable current source 7 of FIG. 13 includes two PMOS transistors Q4 and Q5 constituting a current mirror circuit, an operational amplifier (differential amplifier) 12, and a variable resistor 13.

The variable resistor 13 has a resistance value that is controlled by a control signal output from the control circuit 4. The variable resistor 13 is connected between a drain of a transistor Q4 and a ground node. The operational amplifier 12 includes a positive input terminal to which the drain of the transistor Q4 and one end of the variable resistor 13 are connected. The operational amplifier 12 includes a negative input terminal that receives a reference voltage Vref.

The operational amplifier 12 includes an output terminal that is connected to both gates of the transistors Q4 and Q5. Both sources of the transistors Q4 and Q5 are connected to the first voltage node Vhi. The transistor Q5 includes a drain from which a current is output and supplied to the cathode of the APD 6.

The operational amplifier 12 in the variable current source 7 of FIG. 13 performs feedback control so that voltage on one end side of the variable resistor 13, i.e., at the drain of the transistor Q4, becomes equal to the reference voltage Vref. The resistance value of the variable resistor 13 changes in response to a control signal output from the control circuit 4. The operational amplifier 12 outputs a signal corresponding to a voltage difference between the voltage on one end side of the variable resistor 13 and the reference voltage Vref. This signal is input to both the gates of the transistors Q4 and Q5 to change a drain voltage of the transistor Q4, i.e., the voltage on one end side of the variable resistor 13, and the changed voltage is fed back to the negative input terminal of the operational amplifier 12.

When the control signal from the control circuit 4 changes, the resistance value of the variable resistor 13 changes, and thus a current flowing through the variable resistor 13 changes. The operational amplifier 12 performs feedback control to allow the positive input terminal and the negative input terminal to be equal in potential, so that a current proportional to the current flowing through the variable resistor 13 is output from the drain of the transistor Q5 and supplied to the cathode of the APD 6. When the transistors Q4 and Q5 are equal in size, the same current as the current flowing through the variable resistor 13 is supplied to the cathode of the APD 6 from the drain of the transistor Q5.

The variable current source 7 of FIG. 13 described above can control the resistance value of the variable resistor 13 in response to the control signal from the control circuit 4, whereby a current to be supplied to the cathode of the APD 6 from the variable current source 7 can be controlled.

As a modification of the variable current source 7 of FIG. 13, the variable resistor 13 may have a fixed resistance value, and a voltage level of the reference voltage Vref may be controlled in response to a control signal from the control circuit 4. In this case, the voltage level on one end side of the resistor changes in accordance with the voltage level of the reference voltage Vref, whereby a current flowing through the resistor changes, and the current to be supplied to the cathode of the APD 6 from the variable current source 7 also changes.

(Third Example of Variable Current Source 7)

Figure 14:
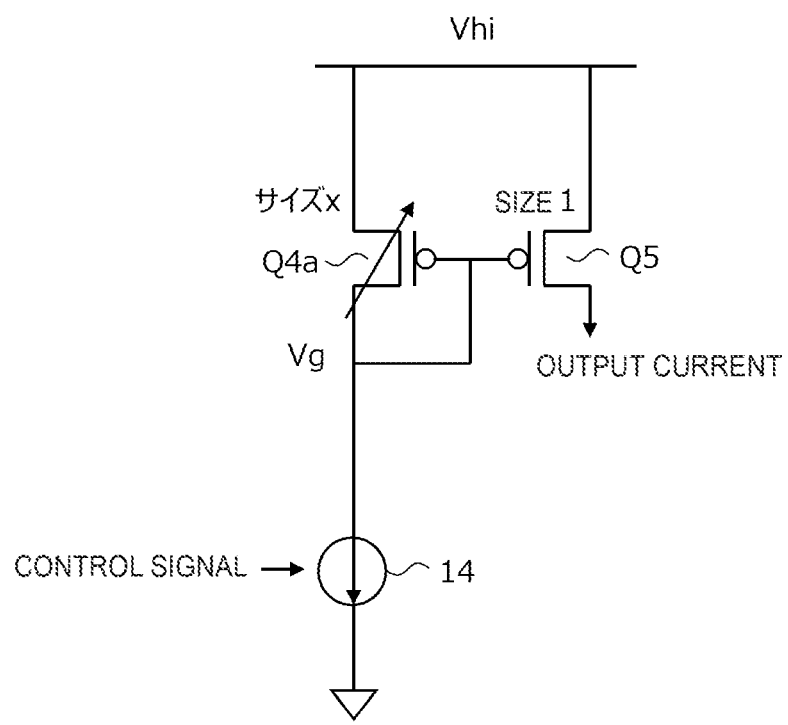
FIG. 14 is a circuit diagram of a third example of the variable current source.

FIG. 14 is a circuit diagram of a third example of the variable current source 7. The variable current source 7 of FIG. 14 includes two PMOS transistors Q4a and Q5 constituting a current mirror circuit, and a current source 14.

The transistor Q4a can be varied in size in response to a control signal, whereby driving ability can be varied. That is, the transistor Q4a can vary its drain current in response to the control signal. The transistors Q4a and Q5 constitute the current mirror circuit. Thus, when the drain current of the transistor Q4a changes in response to the control signal, a current proportional to the drain current is output from a drain of the transistor Q5.

When the transistor Q4a includes a plurality of sub-transistors connected in parallel, and any number of sub-transistors can be selected from the plurality of sub-transistors in response to a control signal from the control circuit 4, the transistor Q4a can be varied in size in response to the control signal to change the drain current of the transistor Q4a.

The current source 14 is connected between a drain of the transistor Q4a and a ground node. To vary the drain current of the transistor Q4a in response to a control signal, the same current as the drain current is caused to flow to the current source 14. Thus, the current source 14 is a variable current source capable of varying a current in response to a control signal.

(First Example of Integrating Level Shifter 11 and Variable Current Source 7)

Although the photodetector 1 of FIG. 8 includes the level shifter 11, there is also a conceivable configuration in which the level shifter 11 and at least a part of the variable current source 7 are integrated.

Figure 15:
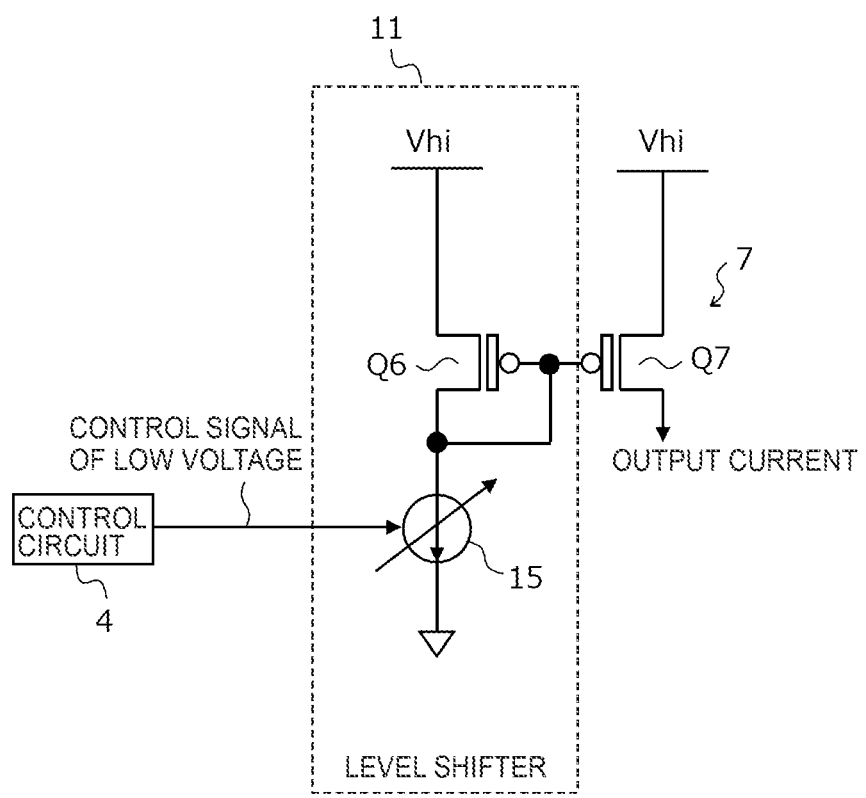
FIG. 15 is a circuit diagram of the first example in which a level shifter and at least a part of the variable current source are integrated.

FIG. 15 is a circuit diagram of a first example in which the level shifter 11 and at least a part of the variable current source 7 are integrated. The level shifter 11 of FIG. 15 includes a PMOS transistor Q6 and a variable current source 15.

Although the control circuit 4 can be composed of a component with low withstand voltage, the variable current source 15 needs to be composed of a component with high withstand voltage. The transistor Q6 constitutes a current mirror circuit together with a PMOS transistor Q7 constituting the variable current source 7. Both sources of the transistors Q6 and Q7 are connected to a first voltage node Vhi. The transistor Q6 includes a gate that is connected to a drain of the transistor Q6, one end of the variable current source 15, and a gate of the transistor Q7.

The variable current source 15 outputs a current that is controlled in response to a control signal from the control circuit 4. When a current flowing through the variable current source 15 changes, a drain current of the transistor Q6 changes, and then a drain current of the transistor Q7 constituting the current mirror circuit with the transistor Q6 also changes. The drain current of the transistor Q7 is supplied to the cathode of the APD 6.

(Second Example of Integrating Level Shifter 11 and Variable Current Source 7)

Figure 16:
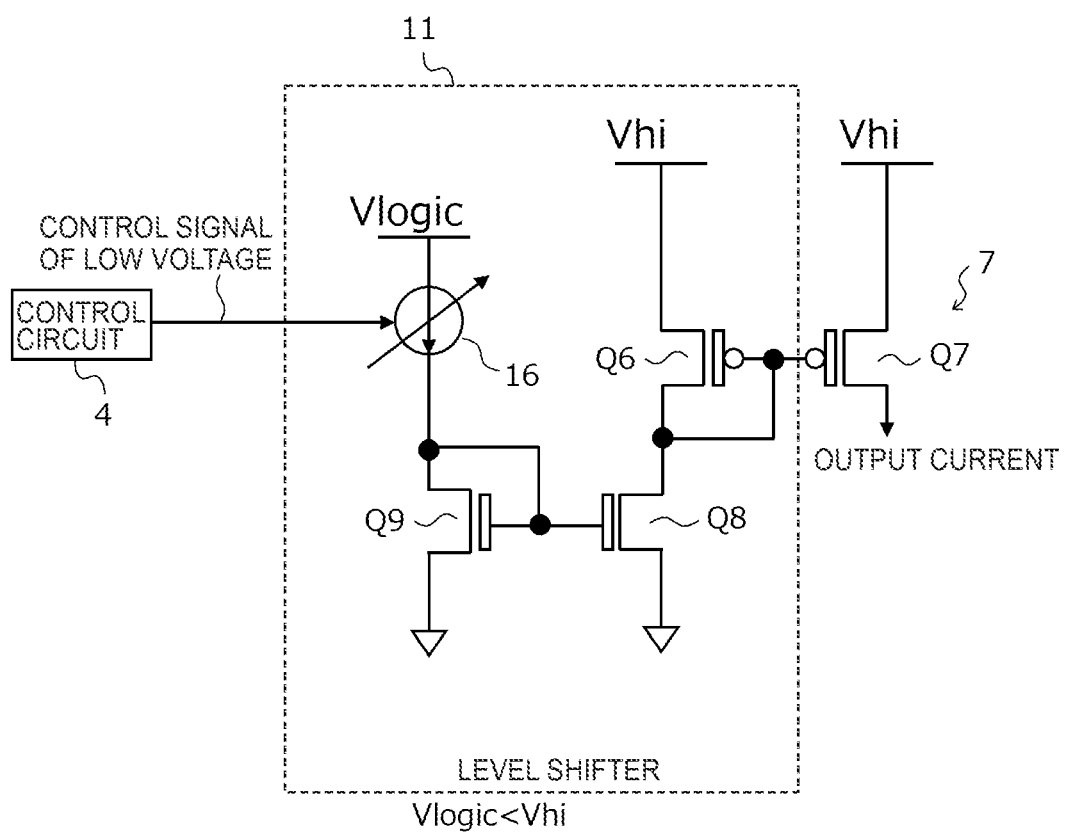
FIG. 16 is a circuit diagram of the second example in which a level shifter and at least a part of the variable current source are integrated.

FIG. 16 is a circuit diagram of a second example in which the level shifter 11 and at least a part of the variable current source 7 are integrated. The level shifter 11 of FIG. 16 includes a PMOS transistor Q6, NMOS transistors Q8 and Q9, and a variable current source 16.

The transistors Q6 and Q8 are cascode-connected between a first voltage node Vhi and a ground node. The transistor Q6 constitutes a current mirror circuit together with an NMOS transistor Q7 constituting the variable current source 7. Both sources of the transistors Q6 and Q7 are connected to a first voltage node Vhi. The drain current of the transistor Q7 is supplied to the cathode of the APD 6.

The transistor Q8 constitutes a current mirror circuit together with the transistor Q9. Both sources of the transistors Q8 and Q9 are connected to a ground node. The variable current source 16 is connected between a drain of the transistor Q9 and a second voltage node Vlogic. The variable current source 16 outputs a current that is controlled in response to a control signal from the control circuit 4. A voltage Vlogic is lower than a voltage Vhi, and a voltage level is converted by the current mirror circuit including the transistors Q8 and Q9. Although the control circuit 4 and the variable current source 16 can be each composed of a component with low withstand voltage, the transistors Q6 and Q7 each need to be a transistor with high withstand voltage.

When the variable current source 16 outputs a current in response to a control signal from the control circuit 4, the current flows to the source of the transistor Q9, and then a current proportional to the current flows to the source of the transistor Q8 and a drain of the transistor Q6. As a result, a current proportional to a drain current of the transistor Q6 flows to a drain of the transistor Q7 and is supplied to the cathode of the APD 6. When a current mirror ratio of the two current mirror circuits in FIG. 16 is 1:1, the same current as a current to be output from the variable current source 16 is supplied to the cathode of the APD 6 from the drain of the transistor Q7.

(Third Example of Integrating Level Shifter 11 and Variable Current Source 7)

Figure 17:
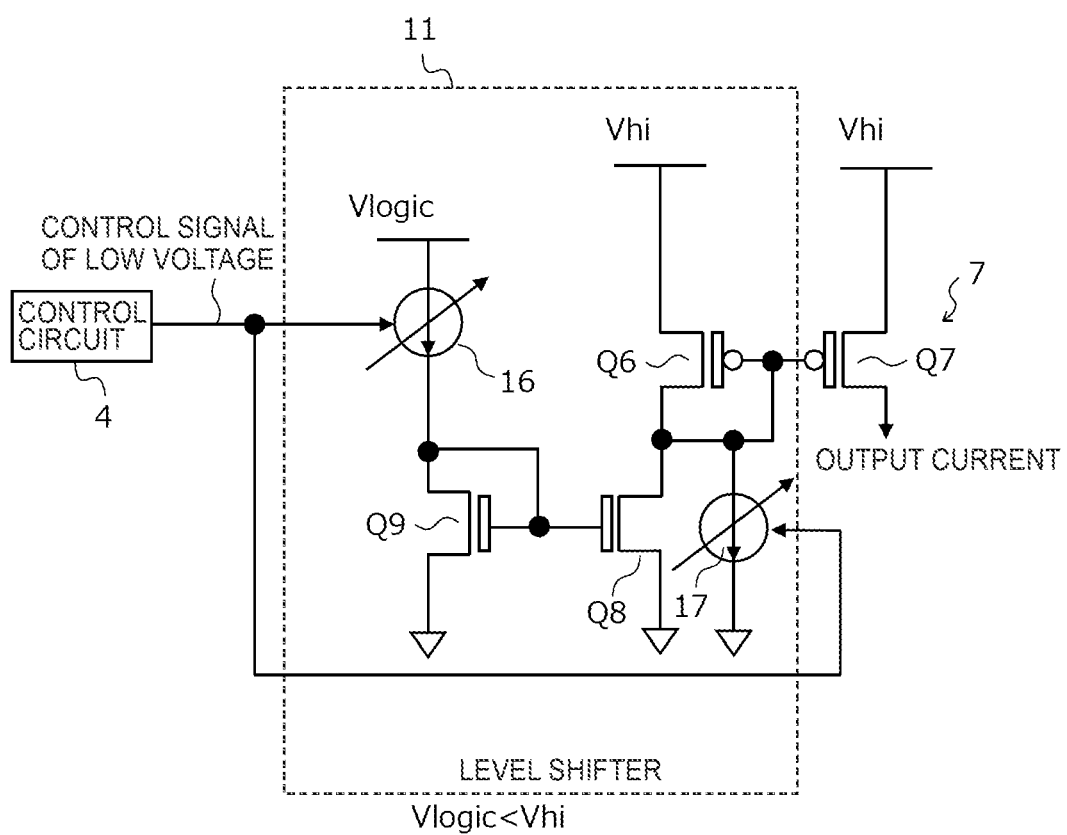
FIG. 17 is a circuit diagram of the third example in which a level shifter and at least a part of the variable current source are integrated.

FIG. 17 is a circuit diagram of a third example in which the level shifter 11 and at least a part of the variable current source 7 are integrated. The level shifter 11 of FIG. 17 includes a PMOS transistor Q6, NMOS transistors Q8 and Q9, a first variable current source 16, and a second variable current source 17.

The transistors Q6 and Q8 are cascode-connected between a first voltage node Vhi and a ground node. The transistor Q6 constitutes a current mirror circuit together with an NMOS transistor Q7 constituting the variable current source 7.

The transistor Q9 and the transistor Q8 constitute a current mirror circuit. The first variable current source 16 is connected between a drain of the transistor Q9 and a second voltage node Vlogic. The transistor Q9 includes a source that is grounded. The second variable current source 17 is connected between a drain of the transistor Q8 and a ground node.

The first variable current source 16 and the second variable current source 17 control a current using a control signal from the control circuit 4. The first variable current source 16 is a current source of low withstand voltage, whereas the second variable current source 17 is a current source of high withstand voltage.

When a current to be output from the first variable current source 16 changes in response to the control signal from the control circuit 4, a current between the drain and the source of the transistor Q9 also changes, and then a current between the drain and the source of the transistor Q8 constituting the current mirror circuit together with the transistor Q9 also changes.

Then, a current to be output from the second variable current source 17 also changes in response to the control signal from the control circuit 4. The current between the drain and the source of the transistor Q8, and the current of the second variable current source 17, are combined into a current that flows between the source and the drain of the transistor Q6. Thus, the drain current of the transistor Q7 constituting the current mirror circuit together with the transistor Q6 changes, and the drain current is supplied to the cathode of the APD 6.

The first variable current source 16 and the transistor Q9 generate a first reset current immediately after the APD 6 detects light. The first reset current is small and requires a long reset time, so that an error of the current greatly affects an error of the reset time, and thus requiring accuracy of the current. Thus, the first reset current is generated by the first variable current source 16, which is composed of a transistor having a low withstand voltage and a small size to have a small size even with a complicated structure, and the transistor Q9. In contrast, the second reset current is large and requires a short reset time, so that an error of the reset time is small even with an error of the current, and thus not requiring accuracy of the second reset current so much. Thus, the second variable current source 17 may be composed of a simple circuit illustrated in FIG. 11, for example.

In the third embodiment described above, the variable current source 7 can be fabricated with various circuit configurations. Integrating the level shifter 11 and at least a part of the variable current source 7 enables configuring the photodetector 1 with a minimum circuit scale in which a part requiring no accuracy has a simple circuit configuration, and a part requiring accuracy has a complicated circuit configuration.

Fourth Embodiment

When the photodetector 1 according to the first to third embodiments is configured as one pixel, a light-receiving sensor can be configured in which pixels are disposed in each two-dimensional direction. The light-receiving sensor can be used for measuring a distance to an object, for example. To improve distance measurement accuracy, the number of pixels needs to be increased, and thus requiring reduction in pixel size as much as possible. Increase in the number of pixels increases power consumption, so that a pixel structure with low power consumption is desirable. A photodetector 1 according to a fourth embodiment described below is devised to reduce a pixel size.

Figure 18:
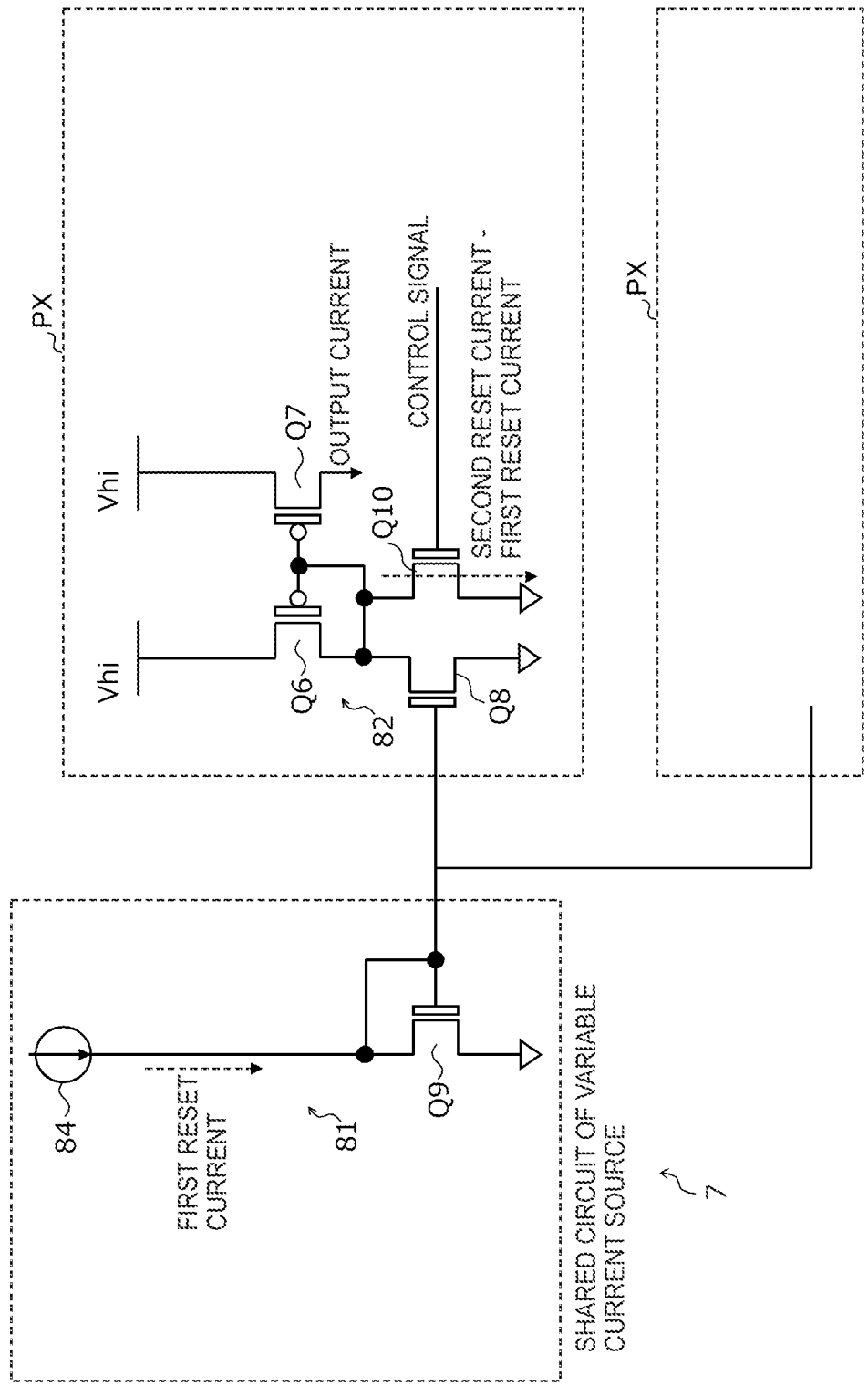
FIG. 18 is a circuit diagram illustrating a configuration of a main part of a photodetector 1 according to a fourth embodiment.

FIG. 18 is a circuit diagram illustrating a configuration of a main part of the photodetector 1 according to the fourth embodiment, and illustrates a circuit configuration of a variable current source 7 in a reset circuit 3.

The variable current source 7 of FIG. 18 includes a first circuit 81 shared by pixels PX, and a second circuit 82 provided for each of the pixels PX.

The first circuit 81 operates immediately after the APD 6 detects light, and supplies a current of a first amount of current to the cathode of the APD 6. Hereinafter, the current of the first amount of current supplied to the APD 6 is referred to as a first reset current.

The second circuit 82 supplies a current of a second amount of current larger than the first amount of current to the cathode of the APD 6. Hereinafter, the current of the second amount of current supplied to the APD 6 is referred to as a second reset current.

The first circuit 81 includes a current source 84 and an NMOS transistor Q9. The second circuit 82 includes PMOS transistors Q6 and Q7, and NMOS transistors Q8 and Q 10, constituting a current mirror circuit.

The transistor Q9 in the first circuit 81 and the transistor Q8 in the second circuit 82 constitute a current mirror circuit. The transistor Q9 includes a drain that is connected to the current source 84, and the transistors Q8 and Q9 each include a source that is grounded.

The transistors Q6 and Q8 are cascode-connected between a first voltage node Vhi and a ground node. The transistor Q10 includes a gate that receives a control signal from a control circuit 4. The transistor Q10 includes a drain that is connected to the gates of the transistors Q6 and Q7, and to both drains of the transistors Q6 and Q8. The transistor Q10 includes a source that is grounded. When a cathode voltage of the APD 6 becomes equal to or higher than a threshold voltage Vth, the transistor Q10 is turned on to cause a current of the amount of current obtained by subtracting the first reset current from the second reset current to flow between the drain and the source of the transistor Q10. At this time, the first reset current flows between the drain and the source of the transistor Q8, so that the second reset current flows between the drain and the source of the transistor Q6. When a current mirror ratio between the transistors Q6 and Q7 is 1:1, the second reset current flows between the drain and the source of the transistor Q7, and then this current is supplied to the cathode of the APD 6.

Immediately after the APD 6 detects light, a current from the current source 84 in the first circuit 81 flows between the drain and the source of the transistor Q9, and a current proportional to a source current of the transistor Q9 flows through the transistor Q8 constituting the current mirror circuit together with the transistor Q9. This current flows between the source and the drain of the transistor Q6. This current also flows to the drain of the transistor Q7 constituting the current mirror circuit together with the transistor Q6. When a current mirror ratio between the transistors Q8 and Q9 and the current mirror ratio between the transistors Q6 and Q7 are each 1:1, a first reset current equal in the amount of current to the first reset current flowing between the drain and the source of the transistor Q9 flows between the drain and the source of the transistor Q7, and this current is supplied to the cathode of the APD 6.

After that, when the transistor Q10 is turned on in response to a control signal from the control circuit 4 to cause a current of the amount of current obtained by subtracting the first reset current from the second reset current to flow between the drain and the source of the transistor Q10, the second reset current flows between the drain and the source of the transistor Q6, and this current is supplied to the cathode of the APD 6.

Although FIG. 18 illustrates an example in which the first circuit 81 that generates the first reset current is shared by the pixels PX, and the second circuit 82 that generates the second reset current is provided for each of the pixels PX, various modifications are conceivable for the circuit configuration of the variable current source 7 in the reset circuit 3. Hereinafter, representative modifications (a first modification and a second modification) will be described in order.

(First Modification)

Figure 19:
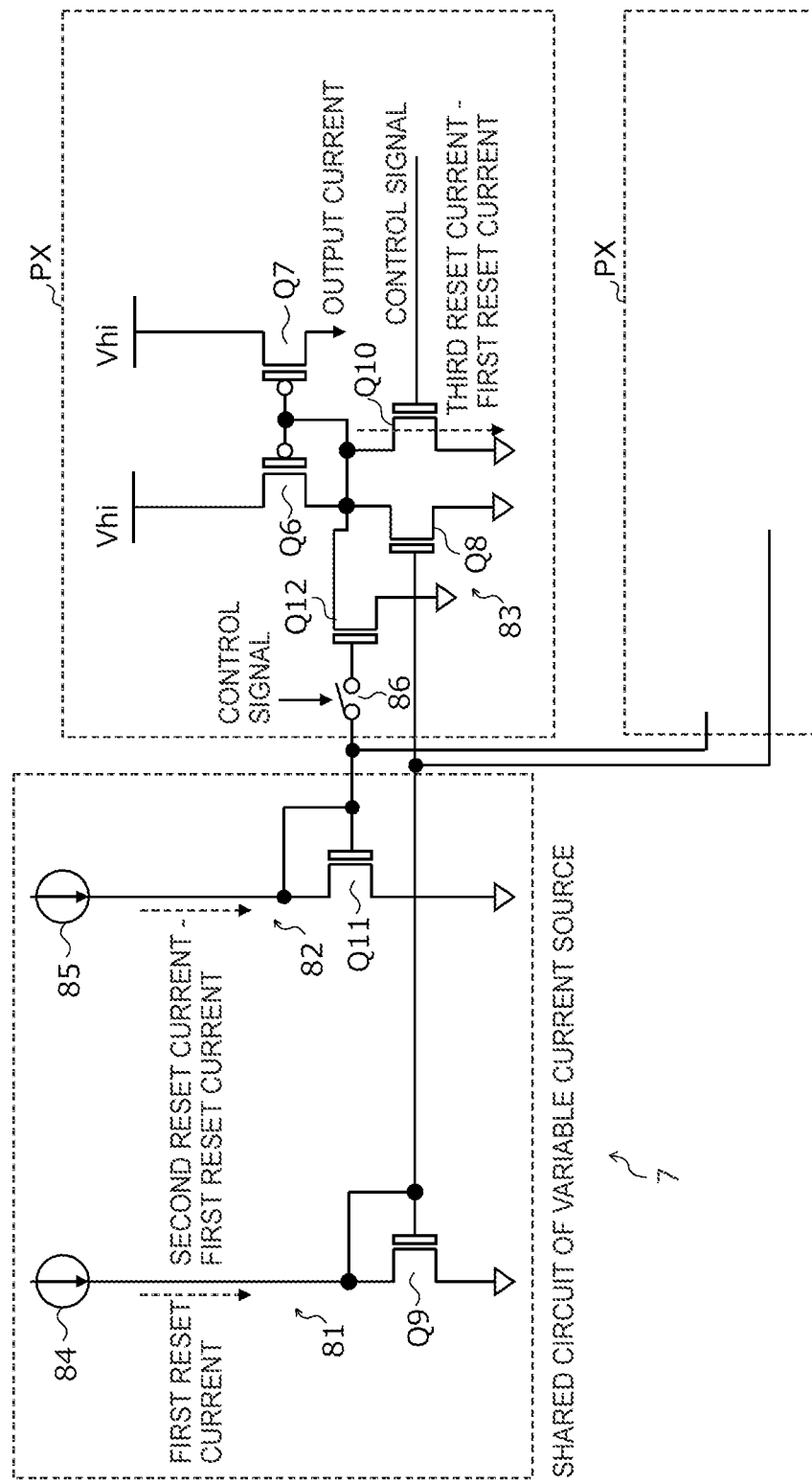
FIG. 19 is a circuit diagram of a first modification of the variable current source.

FIG. 19 is a circuit diagram of a first modification of the variable current source 7. The variable current source 7 of FIG. 19 includes a first circuit 81, a second circuit 82, and a third circuit 83.

The first circuit 81 is configured similarly to the first circuit 81 of FIG. 18, and includes a current source 84 and an NMOS transistor Q9. The current source 84 of FIG. 19 is the same as the current source 84 of FIG. 18, and a current output from the current source 84 flows between the drain and the source of the transistor Q9. This current is a first reset current of the first amount of current. The first circuit 81 is shared by two or more pixels PX. The transistor Q9 includes a source that is grounded, and a gate and a drain that are connected to each other. The transistor Q9 constitutes a current mirror circuit together with an NMOS transistor Q8 in the third circuit 83.

The second circuit 82 includes a current source 85 and an NMOS transistor Q11. The current source 85 outputs a current that flows between a drain and a source of the transistor Q11. This current is of a difference between a second reset current and the first reset current. The transistor Q11 includes the source that is grounded, and a gate and a drain that are connected to each other. The transistor Q11 constitutes a current mirror circuit together with an NMOS transistor Q12 in the third circuit 83. The second circuit 82 is shared by two or more pixels PX.

The third circuit 83 includes a current mirror circuit including PMOS transistors Q6 and Q7, NMOS transistors Q8, Q10, and Q12, and a switching circuit 86. The third circuit 83 is provided for each pixel PX.

Connection of the transistors Q6 to Q8, and Q10 is similar to that in FIG. 18, The transistor Q12 includes a drain that is connected to both drains of the transistors Q6 and Q8. The transistor Q12 includes a source that is grounded.

The transistor Q12 includes a gate that is connected to the gate of the transistor Q11 in the second circuit 82 through the switching circuit 86, and when the switching circuit 86 is turned on, the transistors Q11 and Q12 constitute a current mirror circuit. The switching circuit 86 is turned on or off in response to a control signal from a control circuit 4. The switching circuit 86 is turned on when a cathode voltage of the APD 6 is greater than or equal to a first threshold voltage Vth1 and less than a second threshold voltage Vth2, and the switching circuit 86 is turned off when the cathode voltage of the APD 6 is less than the first threshold voltage Vth1 or greater than or equal to the second threshold voltage Vth2.

Hereinafter, an example in which a current mirror ratio of every current mirror circuit in the variable current source 7 of FIG. 19 are 1:1 will be described.

Immediately after the APD 6 detects light, the first reset current flows between the drain and the source of the transistor Q9 in the first circuit 81. The transistor Q9 constitutes a current mirror circuit together with the transistor Q8 in the third circuit 83, so that a current also flows between the drain and the source of the transistor Q8 and between the source and the drain of the transistor Q6, The transistor Q6 constitutes a current mirror circuit together with the transistor Q7, so that the first reset current flows through the drain of the transistor Q7 to be supplied to the cathode of the APD 6.

When the cathode voltage of the APD 6 reaches the first threshold voltage Vth1, the switching circuit 86 is turned on, and then the same current (second reset current–first reset current) as the drain-source current of the transistor Q11 flows between the drain and the source of the transistor Q12. At this time, the first reset current flows between the drain and the source of the transistor Q8. Thus, the second reset current flows between the drain and source of the transistor Q6, the second reset current being obtained by combining a current (second reset current–first reset current) flowing between the drain and the source of the transistor Q12 and the first reset current flowing between the drain and the source of the transistor Q8. This causes the second reset current to flow through the drain of the transistor Q7 constituting the current mirror circuit together with the transistor Q6 and to be supplied to the cathode of the APD 6.

After that, when the cathode voltage of the APD 6 reaches the second threshold voltage Vth2, the transistor Q12 is turned on and the switching circuit 86 is turned off. This causes a current obtained by subtracting the first reset current from the third reset current to flow between the drain and the source of the transistor Q10. At this time, the first reset current flows between the drain and the source of the transistor Q8, so that the third reset current flows between the drain and the source of the transistor Q6, the third reset current being obtained by adding the current flowing between the drain and the source of the transistor Q10 and the current flowing between the drain and the source of the transistor Q8. This causes the third reset current to flow through the drain of the transistor Q7 constituting the current mirror circuit together with the transistor Q6 and to be supplied to the cathode of the APD 6.

(Second Modification)

Figure 20:
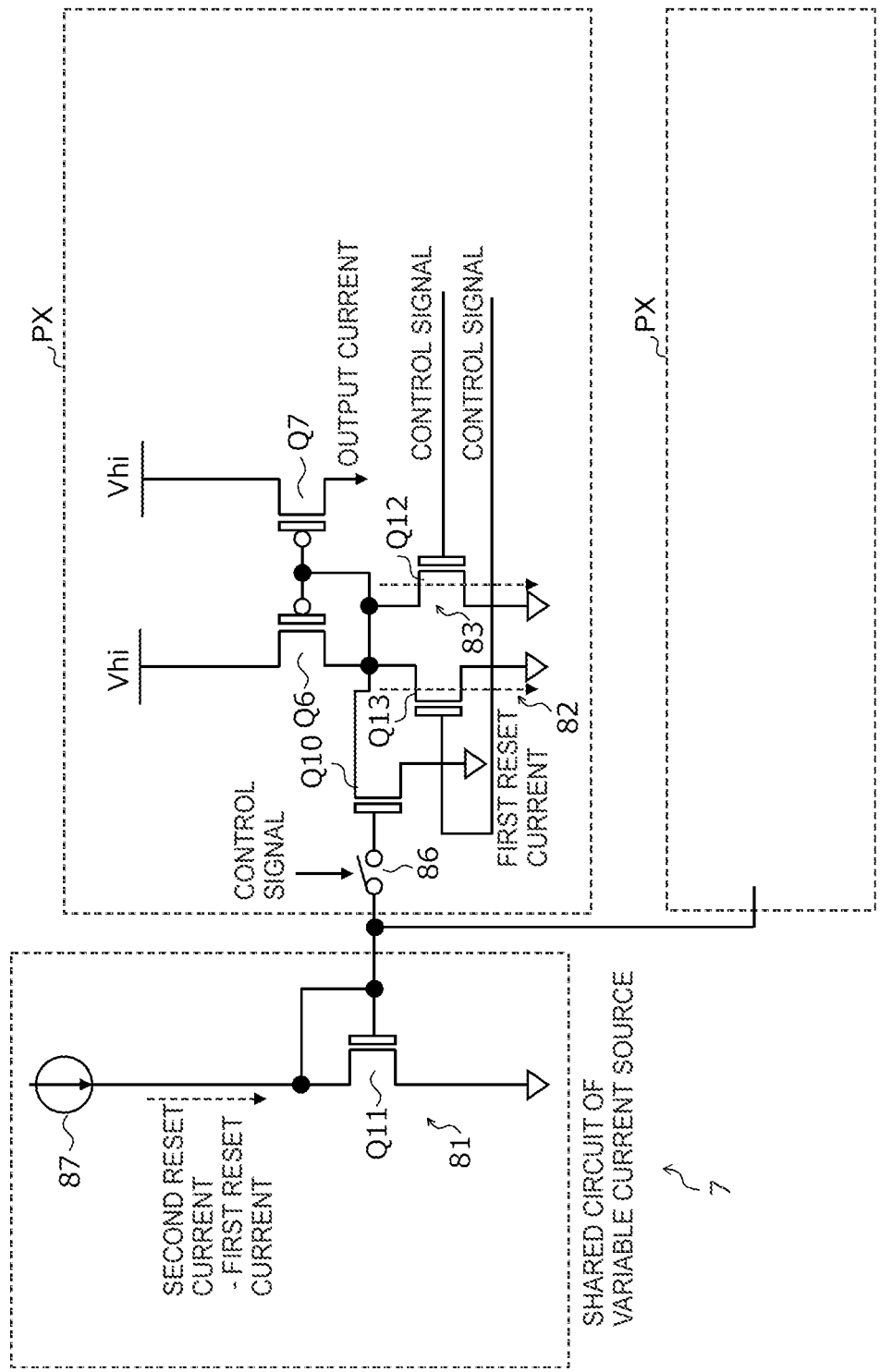
FIG. 20 is a circuit diagram of a second modification of the variable current source.

FIG. 20 is a circuit diagram of a second modification of the variable current source 7. The variable current source 7 of FIG. 20 includes a first circuit 81, a second circuit 82, and a third circuit 83. The first circuit 81 is shared by two or more pixels PX, and the second circuit 82 and the third circuit 83 are provided for each pixel PX.

The first circuit 81 includes a current source 87 and an NMOS transistor Q11. The transistor Q11 includes a drain that is connected to the current source 87, and a source that is grounded. The transistor Q11 includes a gate that is connected to a gate of a transistor Q10 through a switching circuit 86 in the second circuit 82. When the switching circuit 86 is turned on, the transistors Q11 and Q10 constitute a current mirror circuit. The current source 87 outputs a current of the amount of current obtained by subtracting the first reset current from the second reset current. This current flows between the drain and the source of the transistor Q11.

The second circuit 82 includes a current mirror circuit including PMOS transistors Q6 and Q7, NMOS transistors Q10 and Q13, and the switching circuit 86. The third circuit 83 includes a transistor Q12. The third circuit 83 shares the transistors Q6, Q7, and Q13 with the second circuit 82.

The switching circuit 86 is turned on or off in response to a control signal from a control circuit 4. Specifically, the switching circuit 86 is turned on when the cathode voltage of the APD 6 is equal to or higher than the first threshold voltage Vth1 and lower than the second threshold voltage Vth2, and is turned off when the cathode voltage of the APD 6 is lower than the first threshold voltage Vth1 or higher than the second threshold voltage Vth2.

The transistors Q6 and Q13 are cascode-connected between a first voltage node Vhi and a ground node. The transistor Q13 includes a gate that receives a control signal from the control circuit 4. The transistor Q10 includes a drain that is connected to a drain of the transistor Q13 and gates of the transistors Q6 and Q7, and a source that is grounded. The transistor Q12 includes a drain that is connected to the drain of the transistor Q13, and a source that is grounded. The transistor Q12 includes a gate that receives a control signal from the control circuit 4.

The transistor Q13 causes the first reset current to flow between its drain and source immediately after the APD 6 detects light. When the cathode voltage of the APD 6 becomes equal to or higher than the second threshold voltage, the transistor Q12 causes a current obtained by subtracting the first reset current from the third reset current to flow.

Immediately after the APD 6 detects light, the transistor Q13 causes the first reset current to flow between its drain and source in response to a control signal from the control circuit 4. As a result, the transistor Q6 causes the same first reset current as above to flow, and the transistor Q7 constituting the current mirror circuit together with the transistor Q6 also causes the first reset current to flow between the drain and the source of the transistor Q7, and then this current is supplied to the cathode of the APD 6.

When the cathode voltage of the APD 6 reaches the first threshold voltage Vth1, the switching circuit 86 is turned on, and the same current as the current obtained by subtracting the first reset current from the second reset current flowing between the drain and the source of the transistor Q11 flows between the drain and the source of the transistor Q10. This causes the second reset current to flow between the drain and the source of the transistor Q6. Thus, the second reset current also flows between the drain and the source of the transistor Q7 constituting the current mirror circuit together with the transistor Q6, and this current is supplied to the cathode of the APD 6.

When the cathode voltage of the APD 6 reaches the second threshold voltage Vth2, the switching circuit 86 is turned off in response to a control signal from the control circuit 4, and a current obtained by subtracting the first reset current from the third reset current flows between the drain and the source of the transistor Q12. This causes the third reset current to flow between the drain and the source of the transistor Q6. Thus, the third reset current also flows between the drain and the source of the transistor Q7 constituting the current mirror circuit together with the transistor Q6, and this current is supplied to the cathode of the APD 6.

In the fourth embodiment described above, the reset currents generated by the variable current source 7 includes a reset current requiring accuracy that is generated by a circuit with high accuracy, and the circuit is shared by the pixels PX to reduce the entire area of the pixels PX. The reset currents include a reset current without requiring accuracy is generated by a simple circuit provided for each pixel PX. This enables each pixel PX to be minimized in size while shortening dead time of the APD 6.

Fifth Embodiment

Conceivable configurations include a chip formed by disposing the photodetectors according to the first to fourth embodiments in a one-dimensional direction or in each two-dimensional direction.

Figure 21:
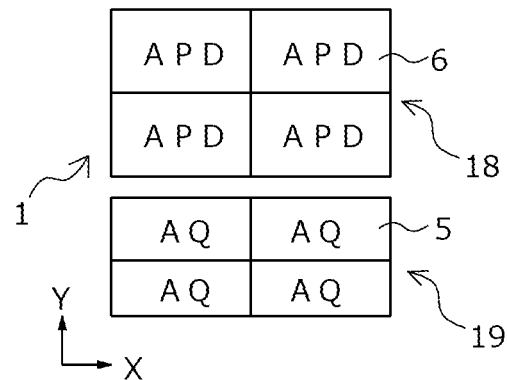
FIG. 21 is a schematic layout diagram of a photodetector.

FIG. 21 is a schematic layout diagram of a photodetector 1 including four APDs 6 and four active quenching circuits (denoted as AQ in the drawing) 5. The photodetector 1 of FIG. 21 is according to any one of the first to fourth embodiments.

The four APDs 6 in FIG. 21 constitute one silicon photomultiplier (SiPM) 18. Additionally, four active quenching circuits 5 constitute an active quenching circuit group 19. Although FIG. 21 illustrates the SiPM 18 in which two APDs 6 are disposed in each of an X-direction and a Y-direction, and two active quenching circuits 5 that are disposed in each of the X-direction and the Y-direction and are adjacent to the SiPM 18, the number and arrangement of the APDs 6 in the SiPM 18, a positional relationship between the SiPM 18 and the active quenching circuits 5, and the like are arbitrary.

Figure 22:
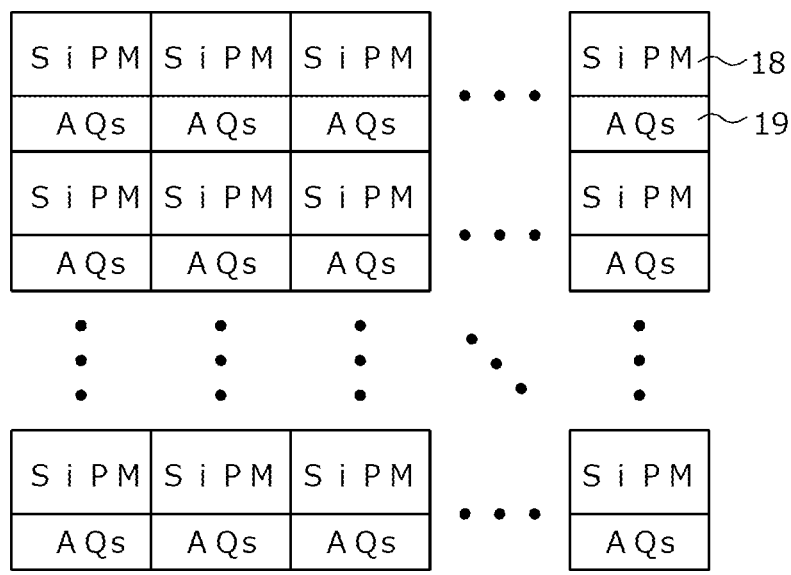
FIG. 22 is a layout diagram in which a plurality of SiPMs and a group of active quenching circuits are disposed on a semiconductor substrate.

In practice, a plurality of SiPMs 18 and a plurality of active quenching circuits 5 as illustrated in FIG. 21 are disposed on a semiconductor substrate to form one chip. FIG. 22 is a layout diagram in which a plurality of SiPMs 18 and a group of active quenching circuits (AQs) 19 are disposed on a semiconductor substrate. As illustrated, a plurality of sets of the SiPM 18 and the active quenching circuit group 19 is disposed in the X-direction and the Y-direction.

Figure 23:
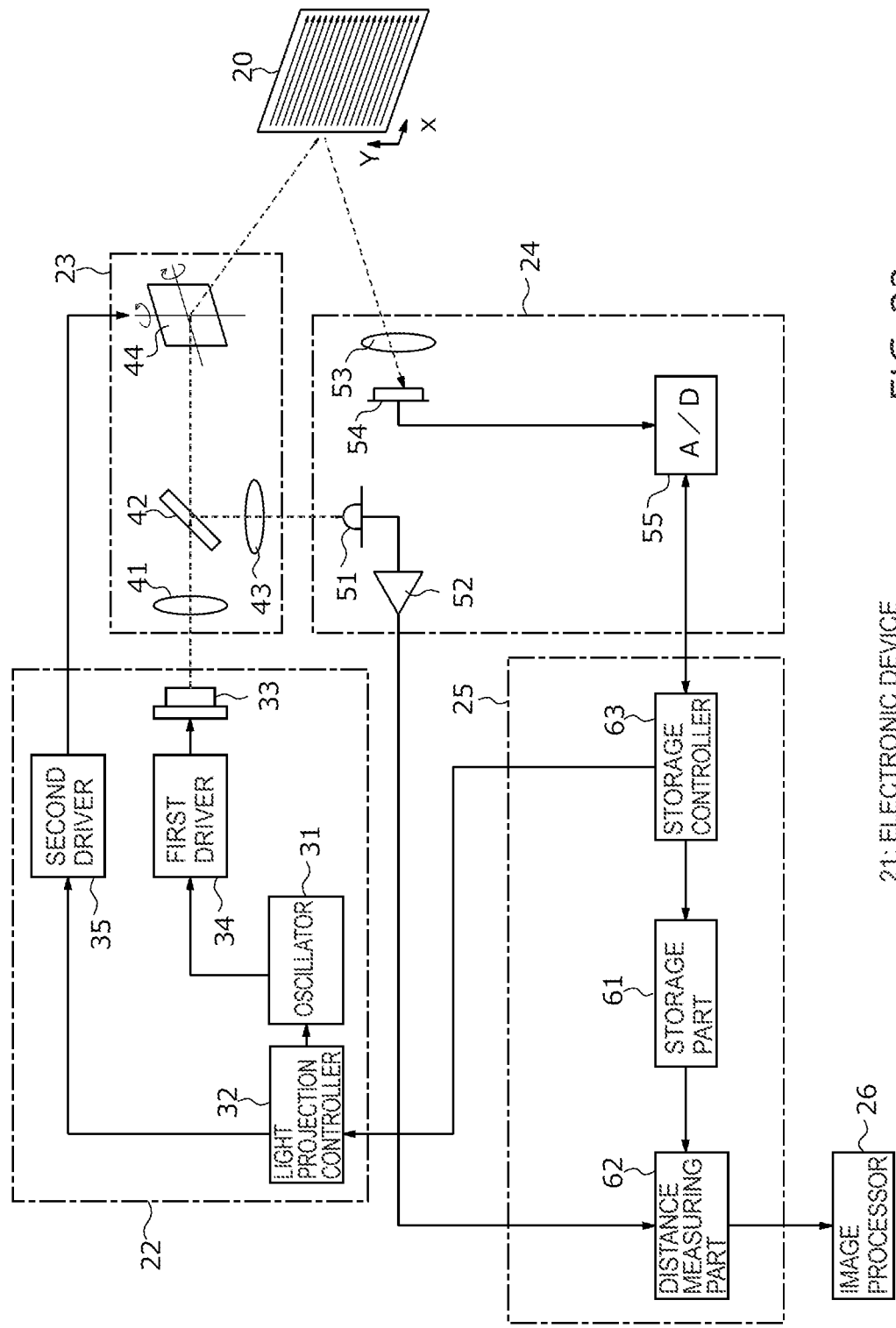
FIG. 23 is a block diagram illustrating a schematic configuration of an electronic device including a light-receiving module incorporating the photodetector 1.

The photodetector 1 according to the first to fifth embodiments described above can be incorporated in an electronic device that performs distance measurement by a time of flight (ToF) method. FIG. 23 is a block diagram illustrating a schematic configuration of an electronic device 21 including a light-receiving module 24 incorporating the photodetector 1 according to the present embodiment. The electronic device 21 of FIG. 23 includes a photo transmitter 22, a light controller 23, the light-receiving module 24, a signal processor 25, and an image processor 26. Among them, the photo transmitter 22, the light controller 23, the light-receiving module 24, and the signal processor 25 constitute a distance measuring device. The photodetector 1 according to the first to fifth embodiments described above is mounted as at least a part of the light-receiving module 24.

At least a part of the electronic device 21 in FIG. 23 can be composed of one or more semiconductor integrated circuits (ICs). For example, the signal processor 25 and the image processor 26 may be integrated inside one semiconductor chip, or the light-receiving module 24 may also be integrated in this semiconductor chip. Additionally, the photo transmitter 22 may also be integrated in the semiconductor chip.

The photo transmitter 22 projects first light. The first light is, for example, a laser beam in a predetermined frequency band. The laser beam is coherent light having a uniform phase and frequency. The photo transmitter 22 intermittently projects the first light, which is pulsed, in a predetermined cycle. The cycle in which the photo transmitter 22 projects the first light is a time interval equal to or longer than time required for the distance measuring device to measure a distance based on one pulse of the first light.

The photo transmitter 22 includes an oscillator 31, a light projection controller 32, a light source 33, a first driver 34, and a second driver 35. The oscillator 31 generates an oscillation signal corresponding to a cycle of projecting the first light. The first driver 34 intermittently supplies power to the light source 33 in synchronization with the oscillation signal. The light source 33 intermittently emits the first light based on the power from the first driver 34. The light source 33 may be a laser element that emits a single laser beam or a laser unit that simultaneously emits a plurality of laser beams. The light projection controller 32 controls the second driver 35 in synchronization with the oscillation signal. The second driver 35 supplies a drive signal synchronized with the oscillation signal to the light controller 23 in response to an instruction from the light projection controller 32.

The light controller 23 controls a traveling direction of the first light emitted from the light source 33. The light controller 23 also controls a traveling direction of second light received.

The light controller 23 includes a first lens 41, a beam splitter 42, a second lens 43, and a scanning mirror 44.

The first lens 41 condenses the first light emitted from the photo transmitter 22 and guides the first light to the beam splitter 42. The beam splitter 42 branches the first light from the first lens 41 into two directions to guide the first light to the second lens 43 and the scanning mirror 44. The second lens 43 guides the branched light from the beam splitter 42 to the light-receiving module 24. The reason why the first light is guided to the light-receiving module 24 is that the light-receiving module 24 detects timing of projecting light.

The scanning mirror 44 is rotationally driven with its mirror surface in synchronization with the drive signal from the second driver 35 in the photo transmitter 22. This controls a reflection direction of the branched light (first light) that is incident on the mirror surface of the scanning mirror 44 after passing through the beam splitter 42. Rotationally driving the scanning mirror 44 with the mirror surface in a constant cycle enables the first light emitted from the light controller 23 to be scanned in at least a one-dimensional direction. Providing axes for rotationally driving the scanning mirror 44 with the mirror surface in two directions enables the first light emitted from the light controller 23 to be scanned in two-dimensional directions. FIG. 23 illustrates an example in which the scanning mirror 44 scans the first light, which is projected from the electronic device 21, in the X-direction and the Y-direction.

When an object 20 is present within a scanning range of the first light projected from the electronic device 21, the first light is reflected by the object 20. Reflected light reflected by the object 20 is at least partly received by the light-receiving module 24.

The light-receiving module 24 includes a photodetector 51, an amplifier 52, a third lens 53, a light-receiving sensor 54, and an A/D converter 55. The photodetector 51 receives the light branched by the beam splitter 42 and converts the light into an electric signal. The photodetector 51 can detect timing of projecting the first light. The amplifier 52 amplifies the electric signal output from the photodetector 51.

The third lens 53 allows a laser beam reflected by the object 20 to form an image on the light-receiving sensor 54. The light-receiving sensor 54 receives a laser beam and converts the laser beam into an electric signal. As the light-receiving sensor 54, the photodetector 1 according to the first to fifth embodiments described above can be applied. The light-receiving sensor 54 is also called a silicon photomultiplier (SiPM).

The A/D converter 55 samples an electric signal output from the light-receiving sensor 54 at a predetermined sampling rate, and performs A/D conversion on the electric signal to generate a digital signal.

The signal processor 25 measures a distance to the object 20 that has reflected the first light, and stores a digital signal corresponding to the second light in a storage part 61. The signal processor 25 includes the storage part 61, a distance measuring part 62, and a storage controller 63.

The distance measuring part 62 measures a distance to the object 20 based on the first light and the reflected light More specifically, the distance measuring part 62 measures the distance to the object based on a time difference between the timing of projecting the first light and timing of receiving the reflected light included in the second light received by the light-receiving sensor 54. That is, the distance measuring part 62 measures the distance based on Expression (1) below.

$$\text{Distance} = \text{light speed} \times (\text{timing of receiving reflected light} - \text{timing of projecting first light})/2 \qquad (1)$$

The term, "timing of receiving reflected light", in Expression (1) more accurately means timing of receiving the reflected light at its peak position. The distance measuring part 62 detects the peak position of the reflected light included in the second light based on the digital signal generated by the A/D converter 55.

Figure 24:
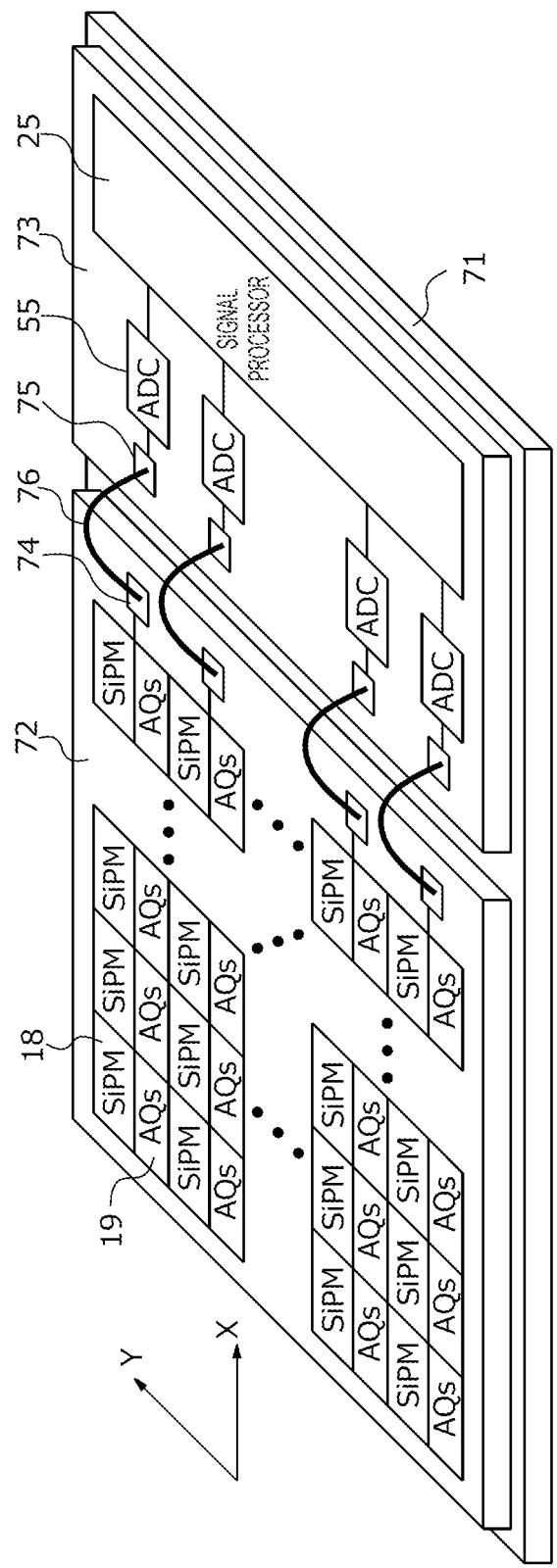
FIG. 24 is a schematic perspective view illustrating an example in which a light-receiving module and a signal processor are mounted on a substrate of a package.

At least a part of the electronic device 21 according to the present embodiment can be mounted by silicon in package (SiP). FIG. 24 is a schematic perspective view illustrating an example in which the light-receiving module 24 and the signal processor 25 are mounted on a substrate of a package. FIG. 24 illustrates a substrate 71 on which a first die 72 and a second die 73 are provided. On the first die 72, the light-receiving sensor 54 in the light-receiving module 24 of FIG. 1 is disposed. The light-receiving sensor 54 is an SiPM 74 including the photodetector 1 of the first to fourth embodiments described above. A plurality of SiPMs 74 is disposed in each of the X-direction and the Y-direction. On the second die 73, the A/D converter (ADC) 55 in the light-receiving module 24 in FIG. 1 and the signal processor 25 are disposed. The first die 72 includes a pad 76 thereon that is connected to a pad 77 on the second die 73 with a bonding wire 78.

Although in the layout diagram of FIG. 24, the plurality of SiPMs 74 is disposed on the first die 72, an active quenching circuit or a passive quenching circuit (AQs) for shortening the dead time of the APD may be disposed corresponding to each SiPM 74.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. A photodetector comprising:
a photodetection element;
a reset circuit that sets one end of the photodetection element to an initialization voltage after the photodetection element detects light, and that includes a variable current source capable of varying a current to be supplied to the one end of the photodetection element;
a control circuit that stepwise or continuously increases a current to be supplied to the one end of the photodetection element by using the variable current source until the one end of the photodetection element is set to the initialization voltage after the photodetection element detects light; and
a plurality of pixels each having the photodetection element,
wherein the variable current source includes:
a first circuit that is shared by two or more of the pixels, and that generates a current applied to one end of the photodetection element; and
a second circuit that is provided for each of the pixels, that is applied to one end of the photodetection element, wherein a current generated by the second circuit requires less accuracy than a current generated by the first circuit.

2. The photodetector according to claim 1, wherein
the reset circuit is connected between a first voltage node and the one end of the photodetection element, and
the control circuit changes on-resistance between the first voltage node and the one end of the photodetection element until the one end of the photodetection element is set to the initialization voltage after the photodetection element detects light.

3. The photodetector according to claim 1, further comprising:
a hold circuit that maintains the one end of the photodetection element at a second potential lower than a first potential for a predetermined period when the photodetection element detects light and the one end of the photodetection element becomes the first potential,
wherein the control circuit increases a current flowing from the one end to another end of the photodetection element stepwise or continuously after elapse of the predetermined period.

4. The photodetector according to claim 3, wherein
the control circuit sets a current to be supplied to the one end of the photodetection element from the variable current source to a first amount of current after the elapse of the predetermined period, and sets the current to be supplied the one end of the photodetection element from the variable current source to a second amount of current larger than the first amount of current when the one end of the photodetection element has a third potential higher than the first potential and lower than the initialization voltage.

5. The photodetector according to claim 4, wherein
the control circuit sets a current to be supplied to the one end of the photodetection element from the variable current source to a third amount of current larger than the second amount of current when the one end of the photodetection element has a fourth potential higher than the third potential and lower than the initialization voltage.

6. The photodetector according to claim 1, wherein
the variable current source includes a transistor that has a control terminal that receives a control signal output from the control circuit and that controls an output current in accordance with a potential level of the control terminal, and
the output current is supplied to the one end of the photodetection element.

7. The photodetector according to claim 1, wherein
the variable current source comprises:
a first transistor;
a second transistor that supplies a current corresponding to an output current of the first transistor to the one end of the photodetection element; and
a differential amplifier that controls potentials of a control terminal of the first transistor and a control terminal of the second transistor to set a drain potential or a source potential of the first transistor to be equal to a predetermined reference potential.

8. The photodetector according to claim 7, wherein
a current flowing between a drain and a source of the first transistor or the predetermined reference potential is controlled to control a current between a drain and a source of the second transistor.

9. The photodetector according to claim 1, wherein
the variable current source includes a current mirror circuit including a first transistor and a second transistor that are provided with respective control terminals connected to each other, and
the control circuit outputs a control signal of adjusting a size ratio of the first transistor to the second transistor to control a current to be supplied to the one end of the photodetection element from the second transistor.

10. The photodetector according to claim 7, further comprising:
a level shifter that converts a potential level of a control signal to be output from the control circuit,
wherein the variable current source controls a current to be supplied to the one end of the photodetection element from the second transistor based on the control signal with the potential level converted by the level shifter.

11. The photodetector according to claim 1, wherein
the first circuit supplies a current of a first amount of current to the one end of the photodetection element after the photodetection element detects light, and
the second circuit supplies a current of a second amount of current larger than the first amount of current to the one end of the photodetection element after the current of the first amount of current is supplied to the one end of the photodetection element.

12. The photodetector according to claim 1, further comprising:
a plurality of the photodetection elements disposed in a one-dimensional or in two-dimensional directions; and
an active quenching circuit including the reset circuit, the active quenching circuit being disposed corresponding to each of the plurality of the photodetection elements,
wherein the plurality of the photodetection elements is each an avalanche photodiode.

13. An electronic device comprising:
a light-receiver that includes the photodetector according to claim 1, and that receives second light including reflected light that is first light reflected by an object;
an analogue-to-digital converter that generates a digital signal corresponding to the second light;
a storage that stores the digital signal; and
a distance measurer that measures a distance to the object based on timing of projecting the first light and timing of receiving the reflected light in the light-receiver.

14. The electronic device according to claim 13, further comprising:
a photo transmitter that projects the first light,
wherein the distance measurer acquires the timing of projecting the first light.

15. A method of photodetection comprising:
detecting light with a photodetection element; and
allowing a reset circuit to stepwise or continuously increase a current to be supplied to one end of the photodetection element using a variable current source in the reset circuit until one end of the photodetection element is set to an initialization voltage after the photodetection element detects light, wherein
the variable current source increases the current to be supplied to one end of the photodetection element stepwise or continuously by using a first circuit and a second circuit,
the first circuit shared by two or more of the pixels generates a current applied to one end of the photodetection element, and the second circuit provided for each of the pixels is applied to one end of the photodetection element, and
a current generated by the second circuit requires less accuracy than a current generated by the first circuit.

16. The photodetector according to claim 3, wherein
the control circuit set, in an envelope that contacts with a plurality of curves indicating a correspondence relationship between a dead time and an afterpulse rate, the hold period at which the afterpulse rate becomes a predetermined design value as a dead time of the photodetection element,
the hold period is a period after the photodetection element detects light for which a voltage of the one end of the photodetection element is maintained, and
the plurality of curves each have different hold periods and are obtained by sweeping the current supplied to the one end of the photodetection element after the photodetection element detects light.

17. A photodetector comprising:
a photodetection element;
a reset circuit that sets one end of the photodetection element to an initialization voltage after the photodetection element detects light, and that includes a variable current source capable of varying a current to be supplied to the one end of the photodetection element;
a control circuit that stepwise or continuously increases a current to be supplied to the one end of the photodetection element by using the variable current source until the one end of the photodetection element is set to the initialization voltage after the photodetection element detects light; and
pixels each having the photodetection element,
wherein the variable current source includes:
a first circuit supplies a current of a first amount of current to the one end of the photodetection element after the photodetection element detects light;
a second circuit supplies a current of a second amount of current larger than the first amount of current to the one end of the photodetection element after the current of the first amount of current is supplied to the one end of the photodetection element; and
a third circuit supplies a current of a third amount of current larger than the second amount of current to the one end of the photodetection element after the current of the second amount of current is supplied to the one end of the photodetection element, wherein
the first circuit is shared by two or more of the pixels or proved for each of the pixels,
the second circuit shared by two or more of the pixels, and
the third circuit provided for each of the pixels.

* * * * *